(12) United States Patent
Liu et al.

(10) Patent No.: US 11,893,444 B2
(45) Date of Patent: Feb. 6, 2024

(54) CONSUMABLE CHIP SYSTEM AND CONSUMABLE CONTAINER

(71) Applicant: HANGZHOU CHIPJET TECHNOLOGY CO., LTD., Hangzhou (CN)

(72) Inventors: Tianxiang Liu, Hangzhou (CN); Heng Zhang, Hangzhou (CN)

(73) Assignee: HANGZHOU CHIPJET TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/215,180

(22) Filed: Jun. 28, 2023

(65) Prior Publication Data

US 2023/0342581 A1 Oct. 26, 2023

Related U.S. Application Data

(63) Continuation-in-part of application No. 17/867,700, filed on Jul. 19, 2022, now Pat. No. 11,726,728, and
(Continued)

(30) Foreign Application Priority Data

Jan. 20, 2020 (CN) .......................... 202010065535.2
Jan. 20, 2020 (CN) .......................... 202010989422.1

(51) Int. Cl.
*G06K 19/077* (2006.01)
*H04L 27/00* (2006.01)

(52) U.S. Cl.
CPC .... *G06K 19/07775* (2013.01); *H04L 27/0008* (2013.01)

(58) Field of Classification Search
CPC ...................... G06K 19/07775; H04L 27/0008
(Continued)

(56) References Cited

U.S. PATENT DOCUMENTS 9,914,306 B2 *  3/2018  Jeran ....................... G06F 21/44
2006/0082815 A1  4/2006  Walker
(Continued)

FOREIGN PATENT DOCUMENTS

CN  105826285 A  8/2016
CN  108128035 A  6/2018
(Continued)

OTHER PUBLICATIONS

International Search Report of PCT/CN2021/072829.
China Office Action of 202010989422.1.
European Search Report of EP21745077.4.

*Primary Examiner* — Allen H Nguyen

(57) ABSTRACT

The present disclosure relates to a consumable chip system and a consumable container. The consumable chip system includes a consumable chip and an antenna board. The consumable chip includes a first die and a first substrate. The first die is encapsulated on the first substrate, and the first die is provided with an interface module. The first substrate is provided with a signal conversion module, and the antenna board is provided with a wireless transceiver module. The wireless transceiver module is configured to receive connection information and an instruction for storing and reading. The signal conversion module is connected to the interface module and the wireless transceiver module, respectively. The consumable chip system is configured to receive connection information by the wireless transceiver module, and establish a wireless connection between the consumable chip and a device for storing and reading on the basis of the connection information.

20 Claims, 10 Drawing Sheets

Related U.S. Application Data a continuation of application No. PCT/CN2021/072829, filed on Jan. 20, 2021.

(58) Field of Classification Search
USPC .......................................................... 358/1.15
See application file for complete search history.

(56) References Cited

U.S. PATENT DOCUMENTS

| | | | | |
|---|---|---|---|---|
| 2016/0179736 A1* | 6/2016 | Qi | ........................... | G06F 13/36 |
| | | | | 710/105 |
| 2020/0257477 A1* | 8/2020 | Chen | ....................... | B41J 29/393 |

FOREIGN PATENT DOCUMENTS

| | | | |
|---|---|---|---|
| CN | 108267943 | A | 7/2018 |
| CN | 109624529 | A | 4/2019 |
| CN | 109656114 | A | 4/2019 |
| CN | 110481185 | A | 11/2019 |
| CN | 110497696 | A | 11/2019 |
| CN | 111338584 | A | 6/2020 |
| EP | 3522012 | A1 | 8/2019 |

\* cited by examiner

CONSUMABLE CHIP SYSTEM AND CONSUMABLE CONTAINER

CROSS-REFERENCE TO RELATED APPLICATIONS

This application is a continuation in part of an U.S. Ser. No. 17/867,700, filed on Jan. 20, 2021, titled "PRINTER CONSUMABLE CHIP UPGRADE SYSTEM AND METHOD, AND CONSUMABLE CONTAINER", which is a continuation of international patent application No. PCT/CN2021/072829, filed on Jan. 20, 2021, which itself claims priority to Chinese patent application No. 202010065535.2, filed on Jan. 20, 2020, titled "CONSUMABLE CHIP STORING AND READING METHOD, CONSUMABLE CHIP, CONSUMABLE CHIP SYSTEM AND STORING AND READING DEVICE", and No. 202010989422.1, filed on Sep. 18, 2020, titled "PRINTER CONSUMABLE CHIP UPGRADE SYSTEM AND METHOD, AND CONSUMABLE CONTAINER". The content of the above identified application is hereby incorporated herein in their entireties by reference.

TECHNICAL FIELD

The present disclosure relates to the field of printing, and in particular, to a consumable chip system and a consumable container.

BACKGROUND

Printers generally have a consumable or a component equipped with a chip. For example, a printer cartridge is usually equipped with a cartridge chip. The cartridge chip is configured to communicate with a device for storing and reading and can upgrade or update content stored on the cartridge chip. However, in the related art, since a contacting design of a contact point is applied to a consumable chip, it is necessary to complete an electrical connection by a contact between metal contact pins and the contact point of the consumable chip, so as to upgrade programs or data of the chip. For example, when a compatible chip of a cartridge in a package needs to upgrade its own programs or data for some reasons, because of the contacting design of the contact point, the cartridge that has been packaged should be taken out from the package for upgrading and repackaged after the chip is upgraded, resulting in cost increases and time losses.

For the issue of low efficiency and high cost of upgrading the consumable chip in the related art, no effective solution has been proposed so far.

SUMMARY

In a first aspect, according to various embodiments of the present disclosure, a consumable chip system is provided. The consumable chip system includes a consumable chip and an antenna board. The consumable chip includes a first die and a first substrate. The first die is encapsulated on the first substrate, and the first die is provided with an interface module. The first substrate is provided with a signal conversion module, and the antenna board is provided with a wireless transceiver module.

The wireless transceiver module is configured to receive connection information and an instruction for storing and reading.

The signal conversion module is connected to the interface module and the wireless transceiver module, respectively. The signal conversion module is configured to convert the instruction for storing and reading into a first conversion signal and transmit the first conversion signal to the interface module, and the consumable chip is configured to execute an operation for storing and reading on the basis of the first conversion signal received by the interface module.

The consumable chip system is configured to receive connection information by the wireless transceiver module, and establish a wireless connection between the consumable chip and a device for storing and reading on the basis of the connection information. The connection information is transmitted from the device for storing and reading.

In some embodiments, the wireless connection includes at least one of an antenna communication, a Bluetooth communication, or an infrared communication.

In some embodiments, the consumable chip includes a first contact point for storing and reading codes disposed on the first substrate, the interface module includes a first interface for storing and reading codes, and the first interface for storing and reading codes is connected to the first contact point for storing and reading codes.

The first contact point for storing and reading codes is configured to receive the instruction for storing and reading and transmit the instruction for storing and reading to the first interface for storing and reading codes.

In some embodiments, the signal conversion module is connected to the first contact point for storing and reading codes and the wireless transceiver module, respectively. The first contact point for storing and reading codes is further configured to receive the first conversion signal transmitted from the signal conversion module and transmit the first conversion signal to the first interface for storing and reading codes.

In some embodiments, the first substrate is provided with a first antenna contact point, and the signal conversion module is connected to the first antenna contact point and the interface module, respectively. The antenna board is provided with a second antenna contact point, the wireless transceiver module is connected to the second antenna contact point, and the second antenna contact point is connected to the first antenna contact point.

In some embodiments, the consumable chip further includes an operation module, the operation module includes a module for storing and reading codes, and the module for storing and reading codes is connected to the interface module. The module for storing and reading codes is configured to execute an operation for storing and reading to the consumable chip based on the first conversion signal or the instruction for storing and reading received by the interface module.

In some embodiments, the signal conversion module includes a modulation-demodulation submodule, a digital logic submodule, and a storage module. The digital logic submodule is connected to the modulation-demodulation submodule and the storage module, respectively. The modulation-demodulation submodule is connected to the wireless transceiver module, and the digital logic submodule is connected to the interface module.

The modulation-demodulation submodule is configured to modulate the instruction for storing and reading transmitted by the device for storing and reading into a standard digital logic signal and transmit the standard digital logic signal to the digital logic submodule.

The digital logic submodule is configured to convert the standard digital logic signal into the first conversion signal and transmit the first conversion signal to the consumable chip and to the storage module.

The storage module is configured to store the first conversion signal transmitted by the digital logic submodule.

In some embodiments, the instruction for storing and reading further includes a reset signal, the signal conversion module further includes a reset logic submodule, the reset logic submodule is configured to read reset information in the storage module according to the reset signal and transmit the reset information to the consumable chip, and the reset information is pre-stored in the storage module.

In some embodiments, the instruction for storing and reading further includes a data feedback signal. The digital logic submodule is further configured to read data in the consumable chip according to the data feedback signal and transmit the data in the consumable chip to the modulation-demodulation submodule. The modulation-demodulation submodule is further configured to transmit the data in the consumable chip to the device for storing and reading by the wireless transceiver module.

In some embodiments, the instruction for storing and reading further includes an update signal of storage data, and the signal conversion module further includes a storage control module configured to update data in the storage module according to the update signal of storage data.

In a second aspect, according to various embodiments of the present disclosure, a consumable container is provided. The consumable container includes a consumable and the consumable chip system. The consumable chip system is mounted on the consumable.

The details of one or more embodiments of the present disclosure are set forth in the accompanying drawings and the description below. Other features, objects and advantages of the present disclosure will become apparent from the description, drawings and claims.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

Figure 1:
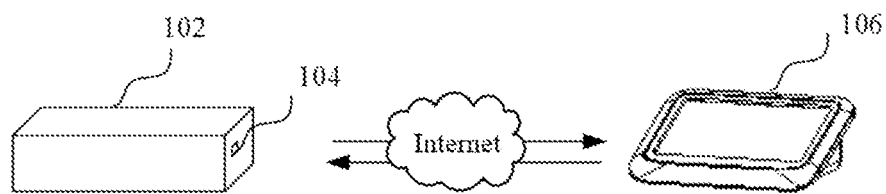
FIG. 1 is a schematic diagram of an application scenario of a consumable chip system in an embodiment of the present disclosure.

In the figures, 34 represents an interface module; 104 represents a consumable chip; 20 represents a first die; 22 represents a first substrate; 68 represents a wireless transceiver module; 24, 84 each represents an antenna; 32 represents an operation module; 86 represents a second die; 106 represents a device for storing and reading; 42 represents a first contact point for storing and reading codes; 82 represents a second contact point for storing and reading codes; 26 represents other function contact points; 60, 80 each represents an antenna board; 62 represents a first antenna contact point; 66 represents a second antenna contact point; 341 represents an antenna interface; 342 represents a first interface for storing and reading codes; 36 represents a signal conversion module; 28 represents a second interface for storing and reading codes; 361 represents a modulation-demodulation submodule; 362 represents a digital logic submodule; 363 represents a storage module; 364 represents a reset logic submodule; 100 represents a consumable container; 101 represents a consumable chip system; and 102 represents a consumable.

DETAILED DESCRIPTION

Hereinafter, the technical solutions in the embodiments of the present disclosure will be clearly and completely described with reference to the accompanying drawings in the embodiments of the present disclosure. Obviously, the described embodiments are merely a part of the embodiments of the present disclosure, rather than all of the embodiments. Based on the embodiments of the present disclosure, all other embodiments obtained by one skilled in the art without creative efforts all belong to the scope of protection of the present disclosure.

In order to facilitate understanding of the present disclosure, a more comprehensive description of the present disclosure will be given below with reference to the relevant drawings. Embodiments of the present disclosure are shown in the drawings. However, the present disclosure may be implemented in many different forms and is not limited to the embodiments described herein. Rather, these embodiments are provided so that this content of the present disclosure will be thorough and complete.

Unless otherwise defined, all technical and scientific terms used herein have the same meaning as commonly understood by one skilled in the art to which the present disclosure pertains. The terminology used in the description of the present disclosure is for the purpose of describing particular embodiments only and is not intended to limit the disclosure.

Although the terms "first," "second," etc. may be used herein to describe various elements, these elements should not be limited by these terms. These terms are configured to distinguish one element from another element.

It should be noted that when an element is referred to as being "connected to" another element, it may be directly connected to the other element or it may be connected to the other element through an intervening element. In addition, "connection" in the following embodiments should be understood as "electrical connection", "communication connection" and the like when there is transmission of electrical signals or data between the objects to be connected.

As used herein, the singular forms, "a," "an," and "the" are intended to include the plural forms as well, unless the context clearly indicates otherwise. Moreover, the terms "may include", "comprising", "includes", "including", and/or "have", "having" when used in this specification, specify the presence of stated features, integers, steps, operations, components, parts, and/or groups thereof, but do not preclude the presence or addition of one or more other features, integers, steps, operations, components, parts, and/or groups thereof.

Referring to FIG. 1, FIG. 1 is a schematic diagram of an application scenario of a consumable chip system in an embodiment of the present disclosure. A consumable chip 104 on a consumable 102 may communicate with a device 106 for storing and reading by a network. The consumable chip 104 may receive connection information transmitted from the device 106 for storing and reading by an interface module 34, and may establish a wireless connection between the consumable chip 104 and the device 106 for storing and reading based on the connection information. The consumable chip 104 may receive an instruction for storing and reading by the interface module 34, and may execute an operation for storing and reading on the basis of the instruction for storing and reading. In an embodiment, the consumable 102 may include, but is not limited to, a cartridge, a toner cartridge, etc. The consumable chip 104 may include, but is not limited to, a cartridge chip, a toner cartridge chip, etc. The device 106 for storing and reading may be, but is not limited to, various personal computers, notebook computers, smart phones, and tablet computers.

Figure 6A:
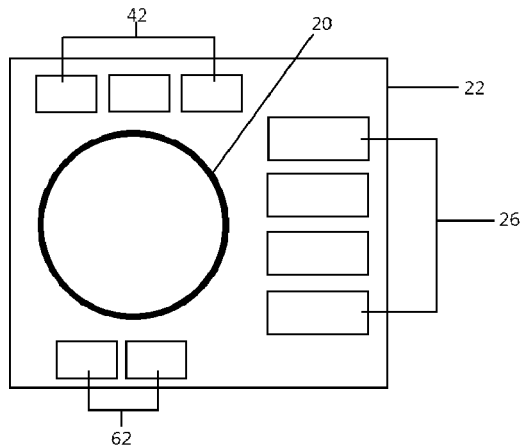
FIG. 6a is a schematic diagram of a consumable chip in a consumable chip system in another embodiment of the present disclosure.
Figure 6B:
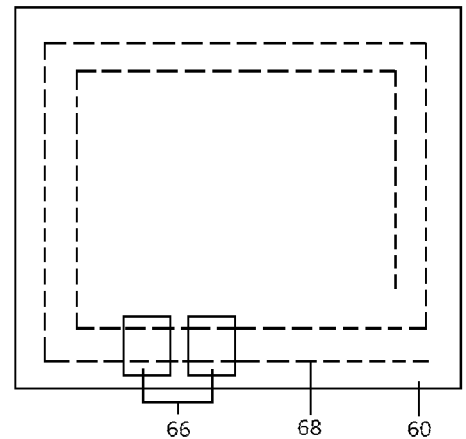
FIG. 6b is a schematic diagram of an antenna board in a consumable chip system in another embodiment of the present disclosure.
Figure 7A:
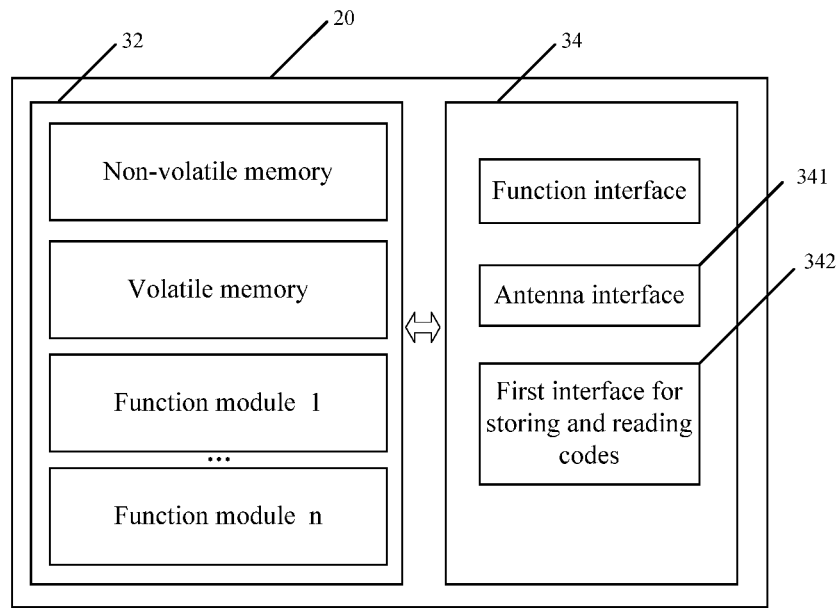
FIG. 7a is a schematic diagram of an interface on a first die in a consumable chip in another embodiment of the present disclosure.
Figure 7B:
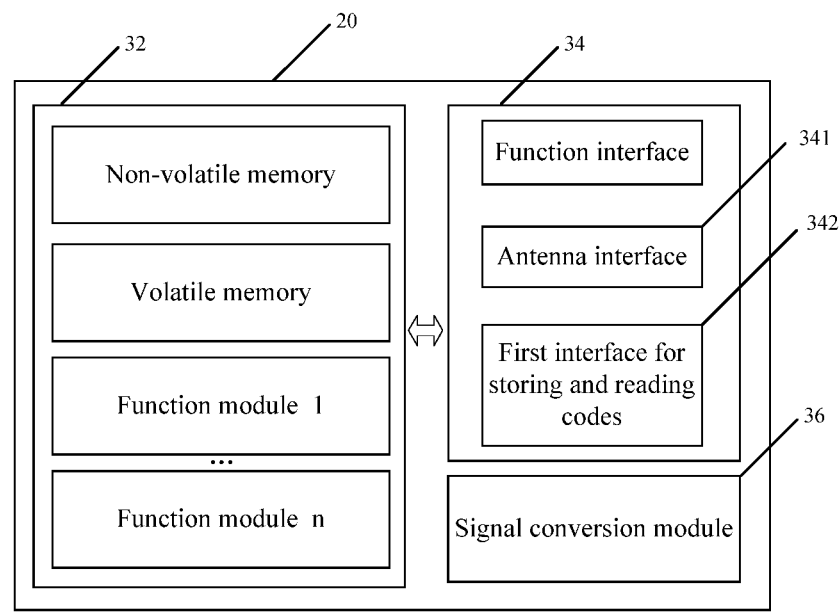
FIG. 7b is a schematic diagram of an interface on a first die in a consumable chip in another embodiment of the present disclosure.

In an embodiment, FIG. 6a is a schematic diagram of a consumable chip in a consumable chip system in another embodiment of the present disclosure, FIG. 6b is a schematic diagram of an antenna board in a consumable chip system in an embodiment of the present disclosure, and FIG. 7b is a schematic diagram of an interface on a first die in a consumable chip in another embodiment of the present disclosure. Referring to FIG. 6a, FIG. 6b, and FIG. 7b, the consumable chip system includes the consumable chip 104 and an antenna board 60, and the consumable chip 104 include a first die 20 and a first substrate 22. The first die 20 is encapsulated on the first substrate 22, the first die 20 is provided with an interface module 34, the first substrate 22 is provided with a signal conversion module 36, and the antenna board 60 is provided with a wireless transceiver module 68. The wireless transceiver module 68 is configured to receive connection information and an instruction for storing and reading. The signal conversion module 36 is connected to the interface module 34 and the wireless transceiver module 68, respectively. The signal conversion module 36 is configured to convert the instruction for storing and reading into a first conversion signal and transmit the first conversion signal to the interface module 34, and the consumable chip 104 is configured to execute an operation for storing and reading on the basis of the first conversion signal received by the interface module 34. The consumable chip system is configured to receive connection information by the wireless transceiver module 68, and establish a wireless connection between the consumable chip 104 and the device 106 for storing and reading on the basis of the connection information. The connection information is transmitted from the device 106 for storing and reading.

In the present disclosure, the consumable chip 104 may use digital signals for reading and storing, and the instruction for storing and reading received by the wireless transceiver module 68 may be a carrier signal (signal frequency). The digital signals and the carrier signal can only communicate with each other after a modulation/demodulation, so the signal conversion module 36 is required for a signal conversion. Specifically, the consumable chip system may receive the instruction for storing and reading transmitted from the device 106 for storing and reading by a RF (Radio Frequency) chip. After being converted by the signal conversion module 36, the instruction for storing and reading may be converted and transmitted to the consumable chip 104 by the interface module 34. In an embodiment, the RF chip may include the signal conversion module 36 and a RF antenna. The signal conversion module 36 may be disposed on the consumable chip 104 and the RF antenna may be disposed on the antenna board 60. Alternatively, the RF antenna and the signal conversion module 36 may be disposed on the antenna board 60 together, or both the RF antenna and the signal conversion module 36 may be disposed on the consumable chip 104 to form an integral RF chip.

It can be understood that the consumable chip 104 is further configured for receiving the connection information (including an authentication instruction) by the interface module 34. The consumable chip 104 may provide feedback information based on the authentication instruction and transmit the feedback information to the interface module 34, so that the interface module 34 may transmit the feedback information to complete an authentication. In this way, the device 106 for storing and reading is capable of interacting with the consumable chip 104 to authenticate whether the consumable chip 104 is legal or not. After an authentication is successful, the device 106 for storing and reading may transmit the instruction for storing and reading, and the consumable chip 104 may receive the instruction for storing and reading by the wireless transceiver module 68.

The consumable chip 104 may further include other function contact points 26 to implement basic functions of the consumable chip 104, such as connection with external devices and the like. Alternatively, when the wireless transceiver module 68 is an antenna, the antenna may be disposed in a spaced-around manner along edges of the antenna board 60. Alternatively, the antenna may be provided on the antenna board 60 in other ways.

It can be understood that the consumable chip system may include the wireless transceiver module 68. When the wireless transceiver module 68 configured for receiving the connection information is disposed on the consumable chip 104, the interface module 34 may only receive the connection information, so that the consumable chip 104 may establish the wireless connection with the device 106 for storing and reading, or may simultaneously receive the connection information and the instruction for storing and reading and transmit the connection information and the instruction for storing and reading to the consumable chip 104. When the wireless transceiver module 68 configured for receiving the connection information is independently disposed outside the consumable chip 104, the interface module 34 may only receive the instruction for storing and reading and transmit the instruction for storing and reading to the consumable chip 104. Alternatively, the wireless transceiver module 68 may realize the wireless connection by ways of at least one of an antenna communication, a Bluetooth communication, an infrared communication, or the like. However, the present disclosure is not limited thereto.

In the consumable chip system may, the connection information may be received by the interface module 34 and the wireless connection between the consumable chip system and the device 106 for storing and reading may be established on the basis of the connection information. In addition, the consumable chip 104 may receive the instruction for storing and reading by the interface module 34 and execute the operation for storing and reading on the basis of the instruction for storing and reading, realizing storing and reading in the consumable chip 104 by wireless means. Even if the consumable chip 104 has been encapsulated and the consumable has been packed, the consumable chip 104 can still be stored and read efficiently and at low cost. The signal conversion module 36 may be disposed on the first substrate 22, and the wireless transceiver module 68 may be disposed on the antenna board 60. The antenna board 60 may be set to be mounted at a designated position of the consumable 102, and the above embodiment is more flexible in implementation and maintenance of the antenna.

In an embodiment, the consumable chip 104 may include a first contact point 42 for storing and reading codes disposed on the first substrate 22, the interface module 34 may include a first interface 342 for storing and reading codes, and the first interface 342 for storing and reading codes is connected to the first contact point 42 for storing and reading codes. The first contact point 42 for storing and reading codes is configured to receive the instruction for storing and reading and transmit the instruction for storing and reading to the first interface 342 for storing and reading codes. In the present embodiment, the operation for storing and reading may be executed to the consumable chip 104 directly by the first contact point 42 for storing and reading codes, or may be executed to the consumable chip 104 in a wireless mode by the wireless transceiver module 68.

In an embodiment, the signal conversion module 36 is connected to the first contact point 42 for storing and reading codes and the wireless transceiver module 68, respectively. The first contact point 42 for storing and reading codes is further configured to receive the first conversion signal transmitted from the signal conversion module 36 and transmit the first conversion signal to the first interface 342 for storing and reading codes. The wireless transceiver module 68 may receive the instruction for storing and reading transmitted from the device 106 for storing and reading, and transmit the instruction for storing and reading to the signal conversion module 36. The signal conversion module 36 may convert the instruction for storing and reading into the first conversion signal and transmit the first conversion signal to the first interface 342 for storing and reading codes. The consumable chip 104 may execute the operation for storing and reading on the basis of the first conversion signal received by the first interface 342 for storing and reading codes.

In an embodiment, the first substrate 22 is provided with a first antenna contact point 62, and the signal conversion module 36 is connected to the first antenna contact point 62 and the interface module 34, respectively. The antenna board 60 is provided with a second antenna contact point 66, the wireless transceiver module 68 is connected to the second antenna contact point 66, and the second antenna contact point 66 is connected to the first antenna contact point 62. The wireless transceiver module 68 may receive the instruction for storing and reading transmitted from the device 106 for storing and reading, and transmit the instruction for storing and reading to the signal conversion module 36 by electrical connection between the second antenna contact point 66 and the first antenna contact point 62. The signal conversion module 36 may convert the instruction for storing and reading into the first conversion signal and transmit the first conversion signal to the first interface 342 for storing and reading codes. The consumable chip 104 may execute the operation for storing and reading on the basis of the first conversion signal received by the interface module 34.

In an embodiment, the consumable chip 104 may further include an operation module 32, the operation module 32 may include a module for storing and reading codes, and the module for storing and reading codes is connected to the interface module 34. The operation module 32 may include, but is not limited to, a non-volatile storage or a volatile storage, and a plurality of function modules. The plurality of function modules may include, but are not limited to, a module for storing and reading codes, a normal function module, an algorithm module, and the like. The module for storing and reading codes is configured to execute an operation for storing and reading to the consumable chip based on the first conversion signal or the instruction for storing and reading received by the interface module.

Based on a structure and an interface arrangement of the consumable chip 104, the device 106 for storing and reading may transmit a wireless signal including the connection information, and the consumable chip system may establish a wireless connection with the device 106 for storing and reading based on the wireless signal. Specifically, the consumable chip 104 may receive the connection information by the wireless transceiver module 68, and transmit the connection information to the operation module 32 of the consumable chip 104. The operation module 32 may be matched and connected with the device 106 for storing and reading based on the connection information. After the operation module 32 is connected to the device 106 for storing and reading successfully, the device 106 for storing and reading may transmit an authentication instruction. The consumable chip 104 may receive the authentication instruction by the wireless transceiver module 68, and transmit the authentication instruction to the operation module 32. The operation module 32 may provide feedback information based on the authentication instruction, and transmit the feedback information to the device 106 for storing and reading by an antenna interface 341 and the wireless transceiver module 68. In this way, the device 106 for storing and reading is capable of interacting with the consumable chip 104 to authenticate whether the consumable chip 104 is legal or not. After an authentication is successful, the device 106 for storing and reading may transmit the instruction for storing and reading, and the consumable chip system may receive the instruction for storing and reading by the wireless transceiver module 68, and transmit the instruction for storing and reading to the module for storing and reading codes in the operation module 32. The module for storing and reading codes may execute the operation for storing and reading to the consumable chip 104 based on the instruction for storing and reading and verify an operation result for storing and reading. If a verification of the operation result for storing and reading is successful, it indicates that the consumable chip 104 is successfully upgraded, and the device 106 for storing and reading may disconnect from the consumable chip 104.

Referring to FIG. 17 to FIG. 20, in an embodiment, the signal conversion module 36 may include a modulation-demodulation submodule 361, a digital logic submodule 362, and a storage module 363. The digital logic submodule 362 is connected to the modulation-demodulation submodule 361 and the storage module 363, respectively. The modulation-demodulation submodule 361 is connected to the wireless transceiver module 68, and the digital logic submodule 362 is connected to the interface module 34. The instruction for storing and reading may include an upgrade signal. The modulation-demodulation submodule 361 is configured to modulate the instruction for storing and reading transmitted from the device 106 for storing and reading into a standard digital logic signal and transmit the standard digital logic signal to the digital logic submodule 362. The digital logic submodule 362 is configured to convert the standard digital logic signal into the first conversion signal and transmit the first conversion signal to the consumable chip 104 and to the storage module 363. The storage module 363 is configured to store basic information of the RF chip and the consumable chip, such as an ID (identity document) number of the RF chip, new consumable chip data, firmware upgrade data, and type, color, and date of the consumable chip, etc. The storage module 363 is configured to store the first conversion signal transmitted by the digital logic submodule 362.

In the present embodiment, when the consumable chip 104 needs a data upgrade, the device 106 for storing and reading may transmit the instruction for storing and reading (including the upgrade signal) to the consumable chip system. The wireless transceiver module 68 may receive the instruction for storing and reading and transmit the instruction for storing and reading to the modulation-demodulation submodule 361. The modulation-demodulation submodule 361 may modulate the instruction for storing and reading into the standard digital logic signal and transmit the standard digital logic signal to the digital logic submodule 362. The digital logic submodule 362 may convert the standard digital logic signal into the first conversion signal, and transmit the first conversion signal to the consumable chip 104 in accordance with read timing of the device 106 for storing and reading. The first conversion signal includes a specific instruction for storing and reading. Meanwhile, the digital logic submodule 362 may store upgrade data of the instruction for storing and reading (i.e., the first conversion signal) in the storage module 363 as a data cache.

Figure 21:
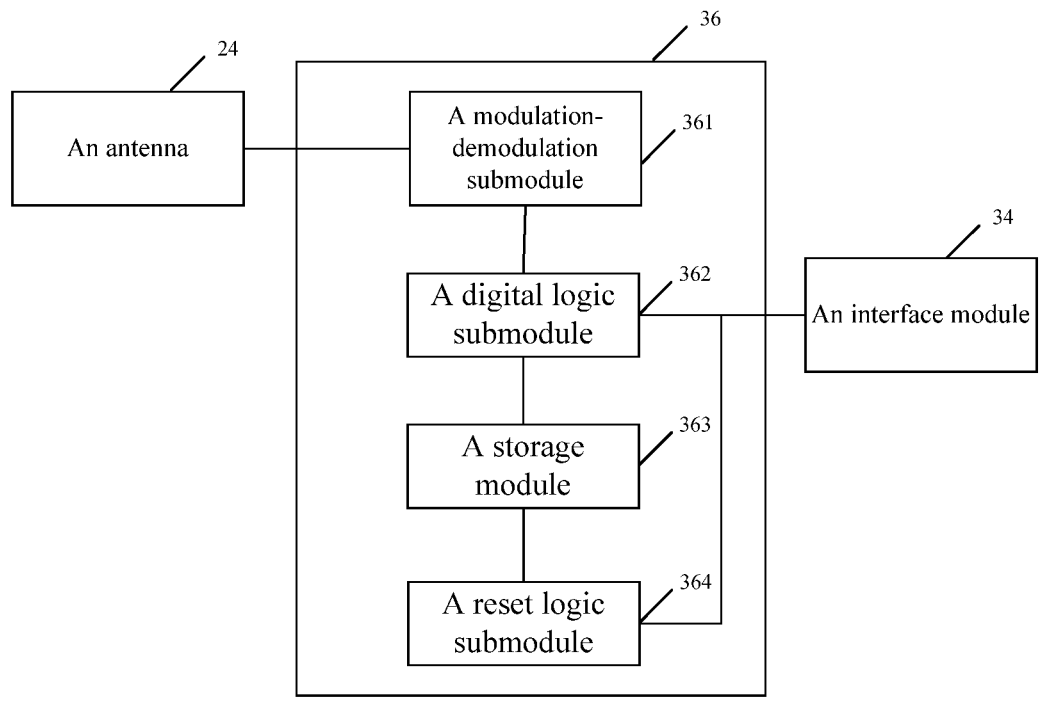
FIG. 21 is a schematic diagram of another signal conversion module of a consumable chip system in an embodiment of the present disclosure.

In an embodiment, referring to FIG. 21, the instruction for storing and reading may further include a reset signal, the signal conversion module 36 may further include a reset logic submodule 364, the reset logic submodule 364 is configured to read reset information in the storage module 363 according to the reset signal and transmit the reset information to the consumable chip 104, and the reset information is pre-stored in the storage module 363.

In the present embodiment, when the consumable chip 104 needs a reset process, the device 106 for storing and reading may transmit the reset signal to the consumable chip system. The wireless transceiver module 68 may receive the reset signal and transmit the reset signal to the modulation-demodulation submodule 361. The modulation-demodulation submodule 361 may modulate the reset signal into the standard digital logic signal and transmit the standard digital logic signal to the digital logic submodule 362. The digital logic submodule 362 may convert the standard digital logic signal into the first conversion signal (including a specific reset instruction), and transmit the first conversion signal to the consumable chip 104. The reset instruction may trigger the reset logic submodule 364, and the reset logic submodule 364 may read reset information in the storage module 363 according to the reset signal and transmit the reset information to the consumable chip 104 to reset the consumable chip 104. The reset signal may correspond to new consumable chip data, and original consumable data may be replaced by the new consumable chip data by a reset operation.

In an embodiment, the instruction for storing and reading may further include a data feedback signal. The digital logic submodule 362 is further configured to read data in the consumable chip 104 according to the data feedback signal and transmit the data in the consumable chip 104 to the modulation-demodulation submodule 361. The modulation-demodulation submodule 361 is further configured to transmit the data in the consumable chip 104 to the device 106 for storing and reading by the wireless transceiver module 68.

In the present embodiment, after the consumable chip 104 is completely upgraded, correctness of the data in the consumable chip 104 need to be verified. Specifically, the device 106 for storing and reading may transmit the data feedback signal to the consumable chip system. The wireless transceiver module 68 may receive the data feedback signal and transmit the data feedback signal to the modulation-demodulation submodule 361. The modulation-demodulation submodule 361 may modulate the data feedback signal into the standard digital logic signal and transmit the standard digital logic signal to the digital logic submodule 362. The digital logic submodule 362 may convert the standard digital logic signal into the first conversion signal, and transmit the first conversion signal to the consumable chip 104. The first conversion signal may include specific data feedback instruction. The digital logic submodule 362 may read data in the storage module 363 in accordance with read timing of the device 106 for storing and reading, and feedback the data to the modulation-demodulation submodule 361 at the same time. Then, the modulation-demodulation submodule 361 may transmit the data to the device 106 for storing and reading by the wireless transceiver module 68, and the device 106 for storing and reading may confirm correctness of the data.

Figure 17:
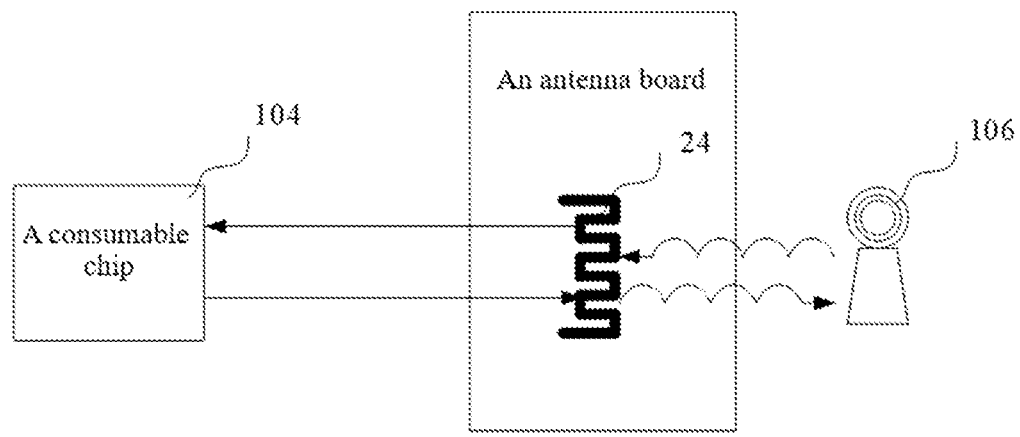
FIG. 17 is a schematic diagram of a consumable chip system in an embodiment of the present disclosure.
Figure 18:
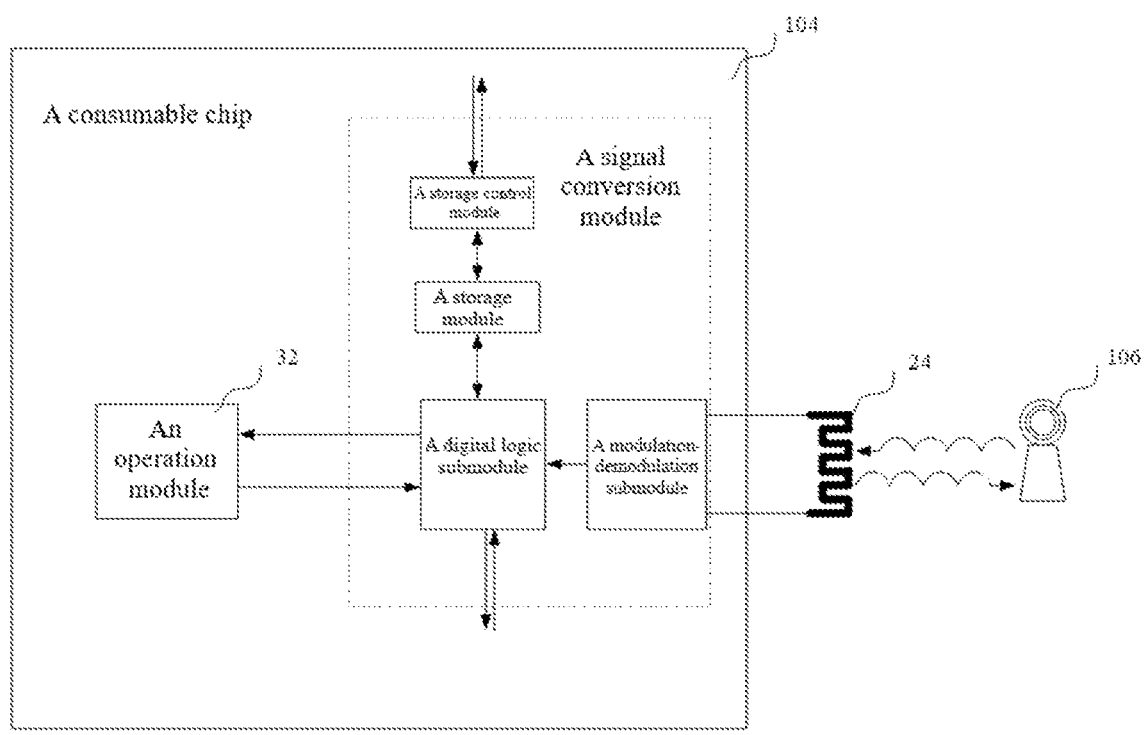
FIG. 18 is a schematic diagram of another consumable chip system in an embodiment of the present disclosure.
Figure 19:
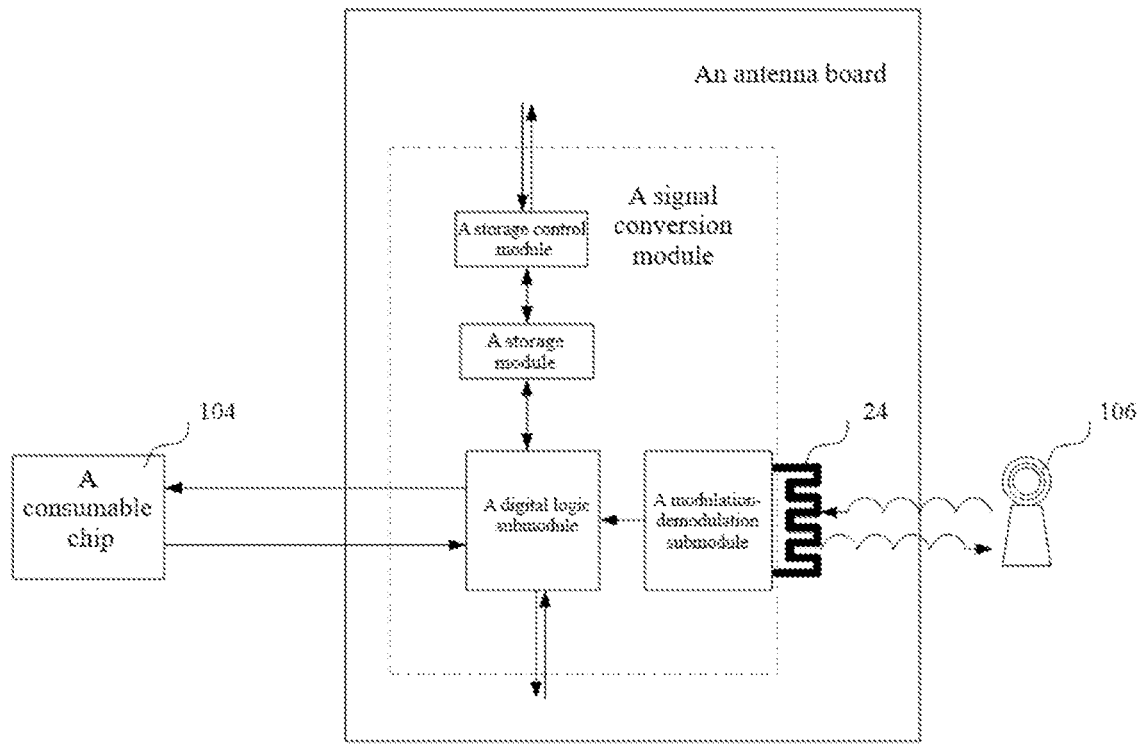
FIG. 19 is a schematic diagram of another consumable chip system in an embodiment of the present disclosure.
Figure 20:
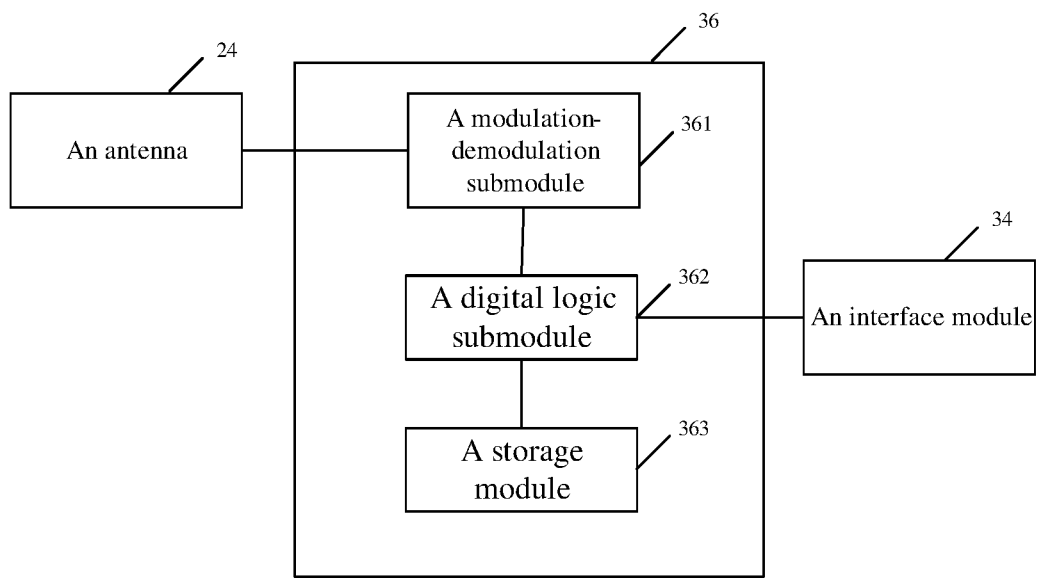
FIG. 20 is a schematic diagram of a signal conversion module of a consumable chip system in an embodiment of the present disclosure.

In an embodiment, referring to FIG. 17, the instruction for storing and reading may further include an update signal of storage data, and the signal conversion module 36 may further include a storage control module. The storage control module is connected to the storage module 363, and configured to update data in the storage module according to the update signal of storage data. In the present embodiment, when the data of the storage module 363 itself needs to be updated, an external device 106 may control the storage module 363 to update data by the storage control module.

Figure 22:
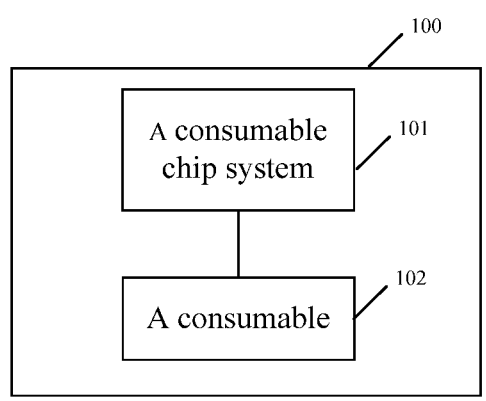
FIG. 22 is a schematic diagram of a consumable container in an embodiment of the present disclosure.

Referring to FIG. 22, the present disclosure further provides a consumable container 100. The consumable container 100 includes a consumable 102 and the consumable chip system 101. The consumable chip system 101 is mounted on the consumable 102. The antenna board 60 of the consumable chip system 101 may be set to be mounted at the designated position of the consumable 102, and the above embodiment is more flexible in implementation and maintenance of the antenna. Even if the consumable chip 104 has been encapsulated and the consumable 102 has been packed, the consumable chip 104 can still be stored and read efficiently and at low cost.

The present disclosure further provides the device 106 for storing and reading. The device 106 for storing and reading may be, but is not limited to, various personal computers, notebook computers, smart phones, and tablet computers. The device 106 for storing and reading may transmit the connection information and the instruction for storing and reading. The consumable chip system 101 may establish the wireless connection between the consumable chip 104 and the device 106 for storing and reading on the basis of the connection information, and execute the operation for storing and reading to the consumable chip based on the instruction for storing and reading.

Figure 2:
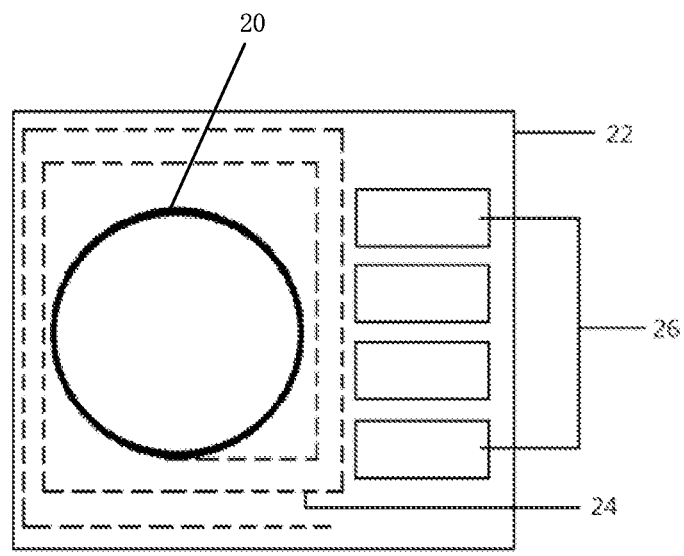
FIG. 2 is a schematic diagram of a consumable chip in an embodiment of the present disclosure.
Figure 3:
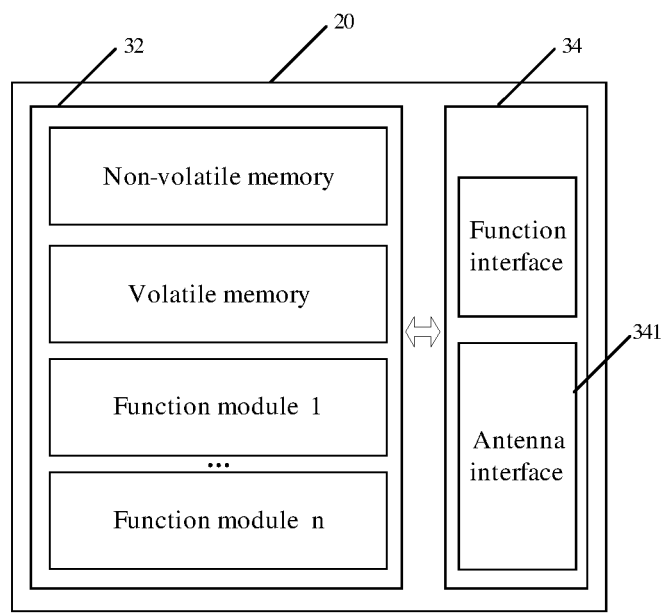
FIG. 3 is a schematic diagram of an interface on a first die in a consumable chip in an embodiment of the present disclosure.

In an embodiment, FIG. 2 is a schematic diagram of a consumable chip 104 in an embodiment of the present disclosure, and FIG. 3 is a schematic diagram of an interface on a first die in a consumable chip in an embodiment of the present disclosure. Referring to FIG. 2 and FIG. 3, an antenna channel on the consumable chip 104 is configured for operation for storing and reading codes, thus the operation for storing and reading codes may be executed in a wireless mode. In an embodiment, the consumable chip 104 may include a first die 20, a first substrate 22, and an antenna 24. The antenna 24 may be disposed around the first die 20 and connected to the first die 20 by an antenna interface 341. It should be noted that the consumable chip 104 may execute a wireless operation for storing and reading codes by an interface module 34. The interface module 34 may include, but is not limited to, an antenna interface 341. Since the antenna interface 341 is connected to the antenna 24, the consumable chip 104 may receive information by the antenna interface 341. In an embodiment, an external antenna board 60 may be connected to the consumable chip 104, and a second antenna contact point 66 of the external antenna board 60 may be connected to a first antenna contact point 62 of the consumable chip 104. The first antenna contact point 62 of the consumable chip 104 may be connected to the interface module 34 of the consumable chip 104, thus a wireless connection of the consumable chip 104 may be realized by the external antenna board 60. In an embodiment, the interface module 34 may include a first interface 342 for storing and reading codes, and the first interface 342 for storing and reading codes may be connected to an interface for realizing a wireless connection, so that the consumable chip may receive information by the first interface 342 for storing and reading codes. The consumable chip 104 may further include other function contact points 26 to implement basic functions of the consumable chip, such as connection with external devices and the like. Referring to FIG. 3, the first die 20 may include an operation module 32. The operation module 32 may include, but is not limited to, a non-volatile storage or a volatile storage, and a plurality of function modules. The plurality of function modules may include, but are not limited to, a module for storing and reading codes, a normal function module, an algorithm module, and the like. The first die 20 may be provided with the interface module 34, including, but not limited to, a normal function interface, the antenna interface 341 and the like. After receiving and processing an external signal, the interface module 34 may transmit the processed signal to the operating module 32, process a signal run by the operating module 32, and transmit processed signal to the antenna interface 341. The antenna interface 341 is connected to a function module for storing and reading codes of the operation module 32. The function module for storing and reading codes may execute operations such as erasing, storing and reading of the internal data of the storage in the first die 20 and other functions executed on the first die 20.

Based on a structure and an interface arrangement of the consumable chip 104, the device 106 for storing and reading may transmit a wireless signal including connection information, and the consumable chip 104 may establish a wireless connection with the device 106 for storing and reading based on the wireless signal. The consumable chip 104 may receive the connection information by the antenna 24, and transmit the connection information to the operation module 32. The operation module 32 may be matched and connected with the device 106 for storing and reading based on the connection information. After the operation module 32 is connected to the device 106 for storing and reading successfully, the device 106 for storing and reading may transmit an authentication instruction. The consumable chip 104 may receive the authentication instruction by the antenna 24, and transmit the authentication instruction to the operation module 32. The operation module 32 may provide feedback information based on the authentication instruction, and transmit the feedback information to the device 106 for storing and reading by the antenna interface 341 and the antenna 24. In this way, the device 106 for storing and reading is capable of interacting with the consumable chip 104 to authenticate whether the consumable chip 104 is legal or not. After an authentication is successful, the device 106 for storing and reading may transmit an instruction for storing and reading, and the consumable chip 104 may receive the instruction for storing and reading by the antenna 24, and transmit the instruction for storing and reading to the module for storing and reading in the operation module 32. The module for storing and reading may execute an operation for storing and reading to the consumable chip 104 based on the instruction for storing and reading and verify an operation result for storing and reading. If a verification of the operation result for storing and reading is successful, it indicates that the consumable chip 104 is successfully upgraded, and the device 106 for storing and reading may disconnect from the consumable chip 104.

In the above embodiment, the consumable chip 104 is provided with the antenna 24 on the first substrate 22 of the consumable chip 104, and the antenna 24 is connected to the first die by the antenna interface 341. The antenna interface 341 is connected to the operation module 32 of the first die 20. Therefore, the connection information may be received by the antenna interface 341 and a wireless connection between the consumable chip 104 and the device 106 for storing and reading may be established based on the connection information. In addition, the consumable chip 104 may receive the instruction for storing and reading by the antenna 24 and execute the operation for storing and reading based on the instruction for storing and reading, thus realizing a wireless storing and reading in the consumable chip 104. Even if the consumable chip 104 has been encapsulated and the consumable 102 has been packaged, the consumable chip 104 can still be stored and read efficiently and at low cost.

Figure 4:
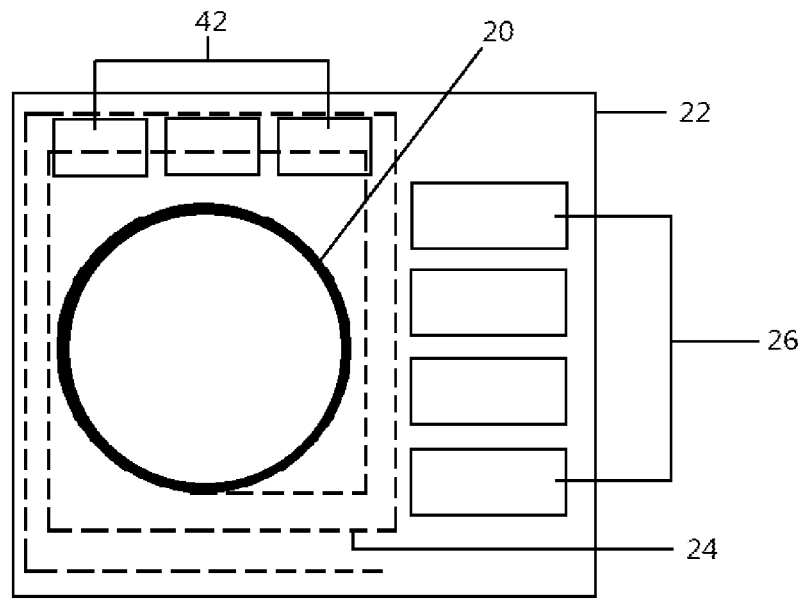
FIG. 4 is a schematic diagram of a consumable chip in another embodiment of the present disclosure.
Figure 5:
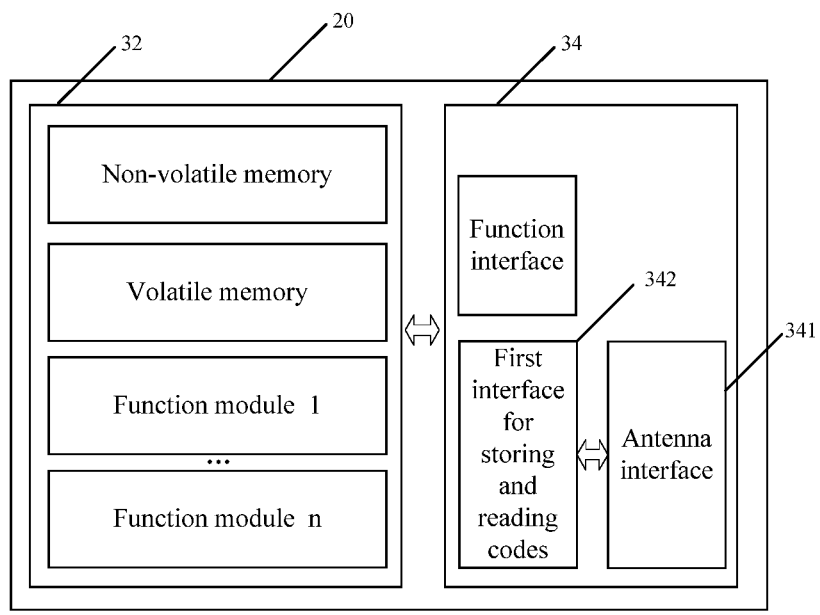
FIG. 5 is a schematic diagram of an interface on a first die in a consumable chip in another embodiment of the present disclosure.

In an embodiment, FIG. 4 is a schematic diagram of a consumable chip in another embodiment of the present disclosure, and FIG. 5 is a schematic diagram of an interface on a first die in a consumable chip in another embodiment of the present disclosure. Referring to FIG. 4, the consumable chip 104 is provided with a first contact point 42 for storing and reading codes and an antenna 24, thus the operation for storing and reading codes may be executed in the consumable chip 104 directly by the first contact point 42 for storing and reading codes, or may be executed in the consumable chip 104 in a wireless mode. The antenna 24 may be disposed around the first die 20 and connected to the first die 20 by the antenna interface 341. The consumable chip 104 may further include other function contact points 26 to realize basic functions of the consumable chip 104, such as connection with external devices, etc. Alternatively, the antenna 24 may be disposed in other ways on the substrate 22 of the consumable chip.

Referring to FIG. 5, a first die 20 may include an operation module 32. The operation module 32 may include, but not limited to, a non-volatile storage or a volatile storage, and a plurality of function modules. The plurality of function modules may include, but not limited to, a module for reading and storing codes, a normal function module, an algorithm module, and the like. The first die 20 is further provided with an interface module 34. The interface module 34 may include, but is not limited to, a function interface, a first interface 342 for storing and reading codes, and an antenna interface 341. The antenna interface 341 may be connected to a first interface 342 for storing and reading codes. After receiving a signal, the antenna interface 341 may transmit the signal to the first interface 342 for storing and reading codes. The first interface 342 for storing and reading codes may be connected to the function module for storing and reading codes of the operation module 32, and the function module for storing and reading codes may execute the operation of erasing, storing and reading the internal data of the storage in the first die 20 and the operation of other functions executed on the first die 20.

Based on a structure and interface arrangement of the consumable chip 104, the device 106 for storing and reading may transmit a wireless signal including the connection information. The consumable chip 104 may establish a wireless connection with the device 106 for storing and reading based on the wireless signal. The consumable chip 104 may receive the connection information by the antenna 24 and transmit the connection information to the first interface 342 for storing and reading codes. The first interface 342 for storing and reading codes may transmit the connection information to the operation module 32, and the operation module 32 may be matched and connected with the device 106 for storing and reading based on the connection information. After the operation module 32 is connected to the device 106 for storing and reading successfully, the device 106 for storing and reading may transmit an authentication instruction. The consumable chip 104 may receive the authentication instruction by the antenna 24, and transmit the authentication instruction to the first interface 342 for storing and reading codes. The first interface 342 for storing and reading codes may transmit the authentication instruction to the operation module 32. The operation module 32 may provide feedback information based on the authentication instruction, and transmit the feedback information to the first interface 342 for storing and reading codes. The first interface 342 for storing and reading codes may transmit the feedback information to the antenna interface 341. The antenna interface 341 may transmit the feedback information to the device 106 for storing and reading by the antenna 24. In this way, the device 106 for storing and reading may interact with the consumable chip 104 to authenticate whether the consumable chip 104 is legal or not. After an authentication is successful, the device 106 for storing and reading may transmit an instruction for storing and reading, and the consumable chip 104 may receive the instruction for storing and reading by the antenna 24. The antenna interface 341 may transmit the instruction for storing and reading to the first interface 342 for storing and reading codes, and the first interface 342 for storing and reading codes may transmit the instruction for storing and reading to the module for storing and reading codes in the operation module 32. The module for storing and reading codes may execute the operation for storing and reading to the consumable chip 104 based on the instruction for storing and reading and verify an operation result for storing and reading. If a verification of the operation result for storing and reading is successful, it indicates that an upgrade of the consumable chip 104 is successful, and the device 106 for storing and reading may disconnect from the consumable chip 104. Alternatively, referring to FIG. 7a, the antenna interface 341 and the first interface 342 for storing and reading codes may be independent of each other, and the antenna interface 341 may not be connected to the first interface 342 for storing and reading codes, but directly connected to the operation module 32. The interface arrangement mode may be also applicable to the above consumable chip structure.

By disposing the first interface 342 for storing and reading codes and the antenna interface 341 simultaneously in the consumable chip 104, the consumable chip 104 may be stored and read by the first interface 342 for storing and reading codes as well as a wireless mode. In addition, there are more choices for storing and reading of the consumable chip 104.

In another embodiment, FIG. 6a is a schematic diagram of a consumable chip in a consumable chip system in another embodiment of the present disclosure, FIG. 6b is a schematic diagram of an antenna board in a consumable chip system in an embodiment of the present disclosure, and FIG. 7a is a schematic diagram of an interface on a first die in a consumable chip in another embodiment of the present disclosure. Referring to FIG. 6a, the consumable chip 104 may include a first die 20 and a first substrate 22. The consumable chip 104 may be further provided with a first contact point 42 for storing and reading codes and a first antenna contact point 62. In normal circumstances, the operation for storing and reading codes to the consumable chip 104 may be executed by the first contact point 42 for storing and reading codes. The consumable chip 104 may further include other function contact points 26 to realize basic functions of the consumable chip 104, such as connection with external devices. Referring to FIG. 6b, an antenna board 60 is provided with a second antenna contact point 66 and an antenna 68 suitable for the consumable chip 104. The antenna 68 may be disposed in a spaced-around manner along edges of the antenna board 60. The first antenna contact point 62 of the consumable chip 104 may be electrically connected to the second antenna contact point 66 of the antenna board 60. Alternatively, the antenna 68 may be provided on the antenna board 60 in other ways.

Referring to FIG. 7a, the first die 20 may include an operation module 32. The operation module 32 may include, but is not limited to, a non-volatile storage or a volatile storage, and a plurality of function modules. The plurality of function modules may include, but are not limited to, a code module, a normal function module, an algorithm module, and the like. An interface module 34 is provided on the first die 20. The interface module 34 may include, but is not limited to, a normal function interface, a first interface 342 for storing and reading codes, an antenna interface 341, etc. After receiving and processing the external signal, the interface module 34 may transmit the processed signal to the operation module 32, and process a signal run by the operation module 32, and transmit the processed signal to the antenna interface 341. The antenna interface 341 may be connected to a function module for storing and reading codes of the operation module 32. The function module for storing and reading codes may execute operations such as erasing, storing and reading the internal data of the storage of the first die 20 and other functions executed on the first die 20. The first interface 342 for storing and reading codes may be connected to the function module for storing and reading codes of the operation module 32, and the function module for storing and reading codes may execute operations such as erasing, storing and reading the internal data of the storage on the die and other functions on the die. Alternatively, the antenna interface 341 may be connected to the first interface 342 for storing and reading codes. After receiving the signal, the antenna interface 341 may transmit the signal to the first interface 342 for storing and reading codes. The first interface 342 for storing and reading codes may be connected to the function module for storing and reading codes of the operation module 32, so that the function module for storing and reading codes may execute operations such as erasing, storing and reading the internal data of the storage in the first die 20 and other functions executed on the first die 20. Alternatively, the consumable chip 104 may not include the first contact point 42 for storing and reading codes in which case the consumable chip 104 may achieve a wireless communication with the device 106 for storing and reading codes by the antenna board 60 connected to the first antenna contact point 62. Based on a structure and an interface arrangement of the consumable chip 104, when the consumable chip 104 is mounted on the consumable 102 and needs to be upgraded, the antenna board 60 may receive a wireless signal transmitted from the device 106 for storing and reading, and realize a transmission of the wireless signal and complete the upgrading, storing and reading operation of the consumable chip 104 by an electrical connection between the first antenna contact point 62 and the second antenna contact point 66. The antenna board 60 may be set to be mounted at a designated position of the consumable 102 or at a designated position of consumable packages. In the above embodiment, the wireless connection between the consumable chip 104 and the device 106 for storing and reading may be realized by adding the first antenna contact point 62 on the consumable chip 104 and adding the antenna board 60 outside the consumable chip 104. Since the antenna 24 is not disposed on the first substrate 22 of the consumable chip 104, the above embodiment is more flexible in implementation and simpler in maintenance of the antenna 24.

Figure 8A:
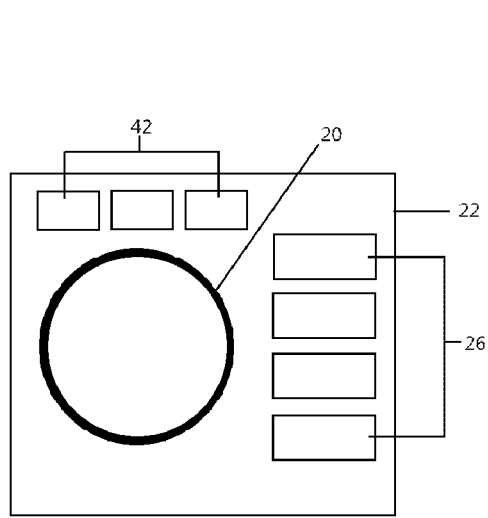
FIG. 8a is a schematic diagram of a consumable chip in another embodiment of the present disclosure.
Figure 8B:
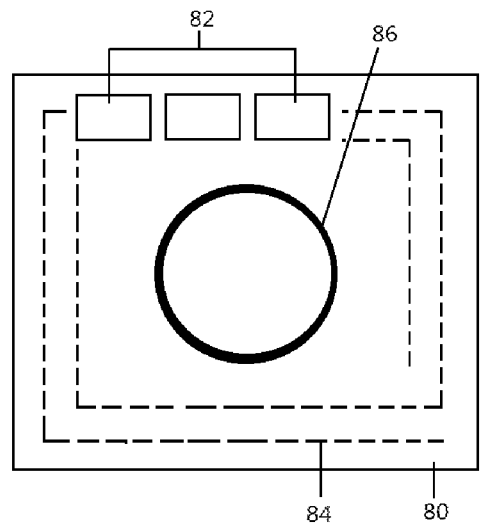
FIG. 8b is a schematic diagram of an antenna board in a consumable chip in another embodiment of the present disclosure.
Figures 9, 10:
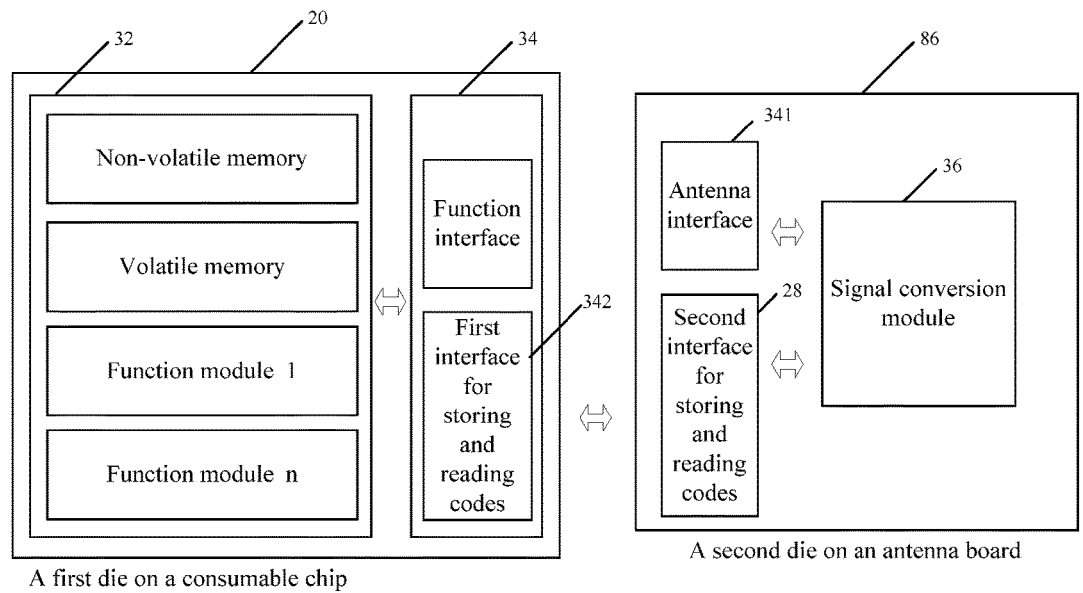
FIG. 9 is a schematic diagram of an interface on a first die in a consumable chip in another embodiment of the present disclosure.
FIG. 10 is a first flowchart of a storing and reading method of a consumable chip in an embodiment of the present disclosure.

In another embodiment, FIG. 8a is a schematic diagram of a consumable chip in another embodiment of the present disclosure, FIG. 8b is a schematic diagram of an antenna board in a consumable chip in another embodiment of the present disclosure, and FIG. 9 is a schematic diagram of an interface on a first die in a consumable chip in another embodiment of the present disclosure. Referring to FIG. 8a, the consumable chip 104 may include a first die 20, a first contact point 42 for storing and reading codes and other function contact points 26. In normal circumstances, an operation for storing and reading codes to the consumable chip 104 may be executed by the first contact point 42 for storing and reading codes. The consumable chip 104 may further include the other function contact points 26 to realize basic functions of the consumable chip 104, such as connection with external devices, etc. Referring to FIG. 8b, an antenna board 80 may be provided with a second contact point 82 for storing and reading codes, an antenna 84 suitable for the consumable chip 104, and a second die 86. The second die 86 may be provided with the signal conversion module 36, and the antenna 84 may be disposed in a spaced-around manner along edges of the antenna board 80. The first contact point 42 for storing and reading codes of the consumable chip 104 may be electrically connected to the second contact point 82 for storing and reading codes of the antenna board 80. Alternatively, the antenna 84 may be disposed on the antenna board 80 in other ways.

Referring to FIG. 9, the first die 20 on the consumable chip 104 may include the operation module 32. The operation module 32 may include, but is not limited to, a non-volatile storage or a volatile storage, and a plurality of function modules. The plurality of function modules may include, but are not limited to, a module for storing and reading codes, a normal function module, an algorithm module, and the like. The first die 20 may be provided with an interface module 34. The interface module 34 may include, but is not limited to, a normal function interface and a first interface 342 for storing and reading codes. After receiving and processing an external signal, the interface module 34 may transmit the processed signal to the operation module 32, process a signal run by the operation module 32, and transmit the processed signal to the first interface 342 for storing and reading codes. An antenna interface 341 on the antenna board 80 may connect a signal conversion module 36 and an external antenna, respectively. The antenna interface 341 may transmit electrical signals bi-directionally with the signal conversion module 36 and the external antenna. For example, the external antenna may sense and receive electrical signals, and the electrical signals may be transmitted to the signal conversion module 36 after being processed by the antenna interface 341. In addition, a signal received by the signal conversion module 36 by the second contact point 82 for storing and reading codes may also be transmitted to the signal conversion module 36 by a second interface 28 for storing and reading codes. The electrical signals processed by the signal conversion module 36 may be transmitted to the antenna interface 341. The antenna interface 341 may transmit the processed signal to the external antenna. The second interface 28 for storing and reading codes is connected to the signal conversion module 36 and the first interface 342 for storing and reading codes, respectively. Electrical signals may be transmitted bi-directionally or uni-directionally between the second interface 28 for storing and reading codes and the signal conversion module 36 or between the second interface 28 for storing and reading codes and the first interface 342 for storing and reading codes. The first interface 342 for storing and reading codes is connected to the function module for storing and reading codes of the operation module 32. The function module for storing and reading codes may execute operations such as erasing, storing and reading of the internal data of the storage in the first die 20 and other functions executed on the first die 20 of the consumable chip 104.

Based on a structure and interface arrangement of the consumable chip 104, when the consumable chip 104 is mounted on the consumable 102 and need to be upgraded, the antenna board 80 may receive a wireless signal transmitted by the device 106 for storing and reading and transmit the wireless signal to the signal conversion module 36 by the antenna interface 341 of the antenna board 80. The signal conversion module 36 may transmit the converted wireless signal to the second interface 28 for storing and reading codes, and then the second interface 28 for storing and reading codes may transmit the converted wireless signal to the first interface 342 for storing and reading codes on the consumable chip 104, so as to realize a transmission of wireless signal and complete an upgrade, and an operation for storing and reading of the consumable chip 104. The antenna board 80 may be set to be mounted at a designated position of the consumable 102 or at a designated position of the consumable packages. In the above embodiment, it does not need to dispose an interface or a contact point on a conventional consumable chip. Instead, a wireless signal may be received and converted by an external antenna board. In addition, an antenna may not be disposed on the first substrate 22 of the consumable chip 104. Therefore, the above embodiment is more flexible in implementation, simpler in maintenance of the antenna, and more convenient in modification of the conventional consumable chip.

According to another aspect of the present disclosure, FIG. 10 is a first flowchart of a storing and reading method of a consumable chip in an embodiment of the present disclosure. Referring to FIG. 10, the storing and reading method of the consumable chip is provided in the embodiment. The method applied to the consumable chip of FIG. 1 is illustrated, including the following step 1010 and step 1020.

Step 1010 may include that a consumable chip receiving connection information by an interface module and establishing a wireless connection between the consumable chip and a device for storing and reading on the basis of the connection information.

At the step 1010, the consumable chip may include a first die and a first substrate, the first die may be encapsulated on the first substrate, and an interface module may be located at the first die. The interface module may include, but not limited to, a normal function interface, a first interface for storing and reading codes, or an antenna interface, etc. For example, the interface module may include the antenna interface connected to an antenna, and the consumable chip may receive information by the antenna interface. Alternatively, an external antenna board may be connected to the consumable chip, a second antenna contact point of the external antenna board may be connected to a first antenna contact point of the consumable chip, the first antenna contact point of the consumable chip may be connected to the interface module of the consumable chip, and a wireless connection may be realized by the external antenna board. Alternatively, the interface module may include a first interface for storing and reading codes, which may be connected to an interface that realizes the wireless connection, and the consumable chip can receive information by the first interface for storing and reading codes. The consumable chip may receive the connection information by the interface module, the connection information may include information required for wireless connection with the device for storing and reading such as an identification code of a wireless device and a key required for the connection, and the consumable chip may establish the wireless connection with the device for storing and reading after obtaining the above connection information.

Step 1020 may include that the consumable chip receiving an instruction for storing and reading and executing an operation for storing and reading on the basis of the instruction for storing and reading.

At the step 1020, after the consumable chip establishes the wireless connection with the device for storing and reading, the consumable chip may receive the instruction for storing and reading by the interface module and execute the operation for storing and reading on the basis of the instruction for storing and reading. The above instruction for storing and reading may include, but not limited to, an upgrade of a built-in program of the consumable chip, a modification of data in the consumable chip, or an extraction of the data in the consumable chip, etc.

In the above storing and reading method of the consumable chip, the connection information may be received by the interface module and the wireless connection between the consumable chip and the device for storing and reading may be established on the basis of the connection information. In addition, the consumable chip may receive the instruction for storing and reading by the interface module and execute the operation for storing and reading on the basis of the instruction for storing and reading, realizing storing and reading to the consumable chip by wireless means. Even if the consumable chip has been encapsulated and the consumable has been packed, the consumable chip may still be stored and read efficiently and at low cost.

In an embodiment, the storing and reading method of the consumable chip may further include: in a case that a first contact point for storing and reading codes receives the instruction for storing and reading, the first contact point for storing and reading codes may transmitting the instruction for storing and reading to the interface module, the interface module may transmitting the instruction for storing and reading to an operation module, the operation module may executing the operation for storing and reading on the basis of the instruction for storing and reading. In this embodiment, the consumable chip may be still provided with the first contact point for storing and reading codes, which may execute the operation for storing and reading to the consumable chip either or both of by a wireless storing and reading way and by the first contact point for storing and reading codes, providing more selectivity for storing and reading of the consumable chip.

Figure 11:
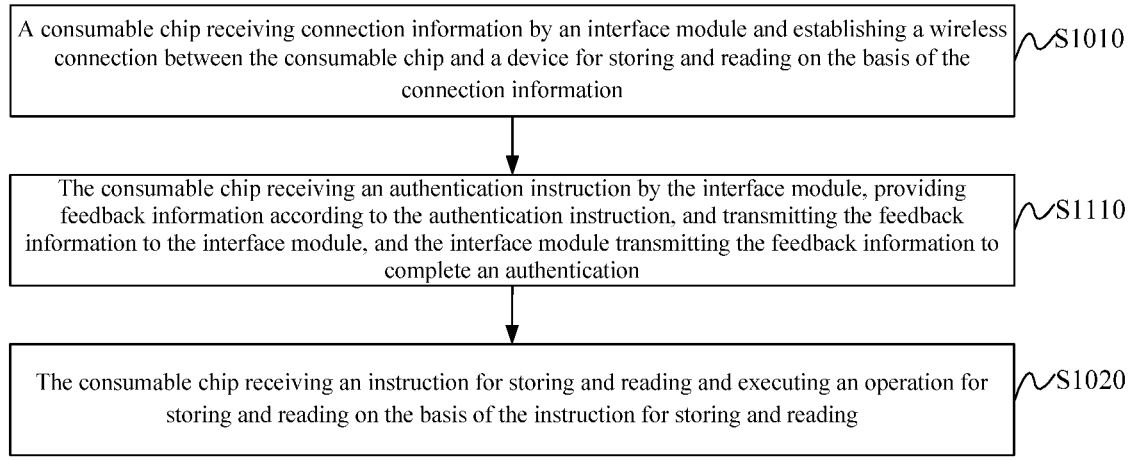
FIG. 11 is a second flowchart of a storing and reading method of a consumable chip in an embodiment of the present disclosure.

In an embodiment, FIG. 11 is a second flowchart of a storing and reading method of a consumable chip in an embodiment of the present disclosure. Referring to FIG. 11, after the consumable chip establishes a wireless connection between the consumable chip and the device for storing and reading on the basis of the connection information, the method may further include step 1110.

Step 1110 may include that the consumable chip receiving an authentication instruction by the interface module, providing feedback information according to the authentication instruction, and transmitting the feedback information to the interface module, and the interface module transmitting the feedback information to complete an authentication. In the present embodiment, in the process of storing and reading to the consumable chip, an authentication is added. The device for storing and reading may verify an identity of the consumable chip by interacting with the information of the consumable chip by the authentication, so that an interaction of data in the process of storing and reading may be more secure and reliable, thus increasing the security of the process of storing and reading. In addition, a verification of the operation result may be added after the process of storing and reading to the consumable chip, and the connection between the device for storing and reading and the consumable chip may be disconnected after confirming a successful completion of the operation of storing and reading to save energy.

Figure 12:
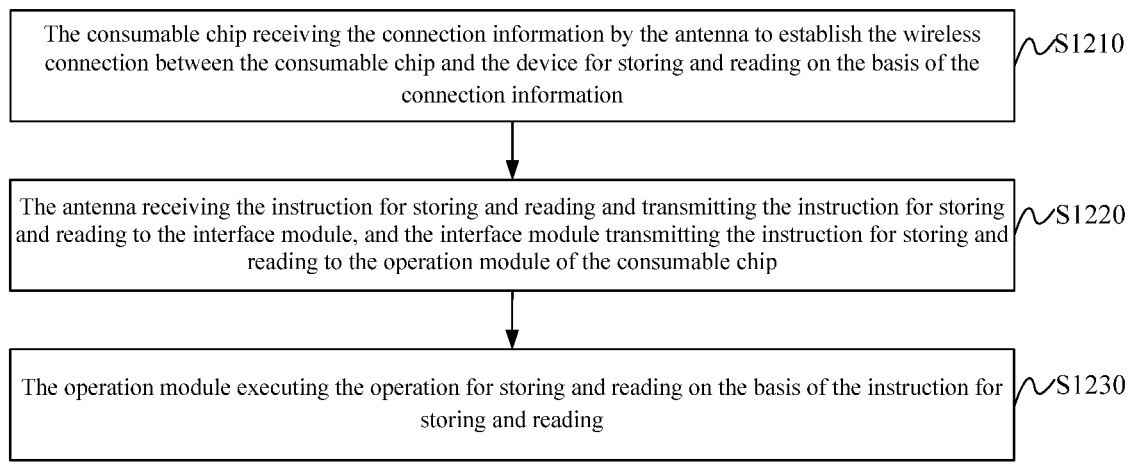
FIG. 12 is a third flowchart of a storing and reading method of a consumable chip in an embodiment of the present disclosure.

In an embodiment, FIG. 12 is a third flowchart of a storing and reading method of a consumable chip in an embodiment of the present disclosure. Referring to FIG. 12, the method may include step 1210, step 1220 and step 1230.

Step 1210 may include that the consumable chip receiving the connection information by the antenna to establish the wireless connection between the consumable chip and the device for storing and reading on the basis of the connection information.

At the step 1210, the consumable chip may include the antenna disposed on the first substrate, and the antenna is connected to the interface module. Alternatively, the interface module may include, but not limited to, the antenna interface connected to the antenna.

Step 1220 may include that the antenna receiving the instruction for storing and reading and transmitting the instruction for storing and reading to the interface module, and the interface module transmitting the instruction for storing and reading to the operation module of the consumable chip.

The first die may include the operation module, the operation module may include, but not limited to, a non-volatile memory or a volatile memory, and a plurality of functional modules. The plurality of functional modules may include, but not limited to, a module for storing and reading codes, a normal functional module, or an algorithm module, etc. The operation for storing and reading to the first die, i.e., the consumable chip may be executed by the operation module. The interface module may receive and process an external electrical signal, transmit a processed electrical signal to the operation module, and transmit an electrical signal processed by the operation module to an external interface, such as the antenna, the second contact point for storing and reading codes, etc. At the step 1220, the antenna may receive the instruction for storing and reading and transmit the instruction for storing and reading to the interface module, which may include an interface connected to the operation module. The instruction for storing and reading may be transmitted to the operation module by the interface.

Step 1230 may include that the operation module executing the operation for storing and reading on the basis of the instruction for storing and reading.

After the operation module receives the instruction for storing and reading, the module for storing and reading codes in the operation module may execute the operation for storing and reading on the basis of the instruction for storing and reading.

In the present embodiment, the first substrate of the consumable chip is further provided with the antenna, and the consumable chip itself may complete the wireless connection and wireless storing and reading without accessing an additional wireless connection module, providing a more convenient and efficient wireless connection way.

Figure 13:
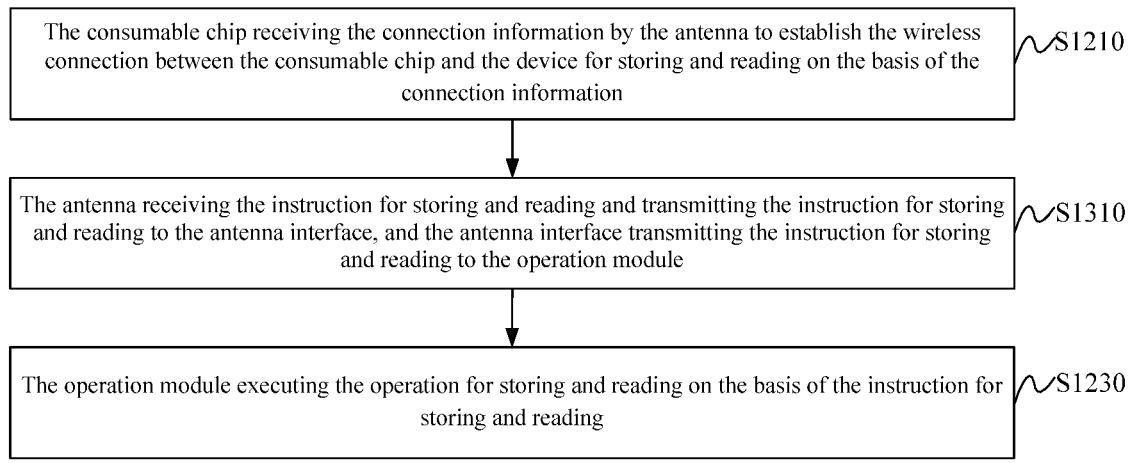
FIG. 13 is a fourth flowchart of a storing and reading method of a consumable chip in an embodiment of the present disclosure.

In an embodiment, FIG. 13 is a fourth flowchart of a storing and reading method of a consumable chip in an embodiment of the present disclosure. Referring to FIG. 13, the antenna receiving the instruction for storing and reading and transmitting the instruction for storing and reading to the interface module, and the interface module transmitting the instruction for storing and reading to the operation module may include step 1310.

Step 1310 may include that the antenna receiving the instruction for storing and reading and transmitting the instruction for storing and reading to the antenna interface, and the antenna interface transmitting the instruction for storing and reading to the operation module.

The present embodiment applies to a case that the interface module of the consumable chip includes the antenna interface connected to the operation module. The antenna may receive the instruction for storing and reading from the device for storing and reading and transmit the instruction for storing and reading to the antenna interface. The antenna interface may convert a received instruction for storing and reading from an electrical signal to a digital signal which could be recognized by the module for storing and reading codes in the operation module, and transmit a converted instruction for storing and reading to the operation module to realize the operation for storing and reading to the consumable chip. The process of receiving, converting and transmitting signals is not only applicable to the transmission of the instruction for storing and reading, but also applicable to the process of connection establishment and various stages of data exchange between the consumable chip and the device for storing and reading. Since the first substrate of the consumable chip is provided with the antenna, the consumable chip itself may complete the wireless connection and wireless storing and reading without accessing an additional wireless connection module, providing a more convenient and efficient wireless connection way.

Figure 14:
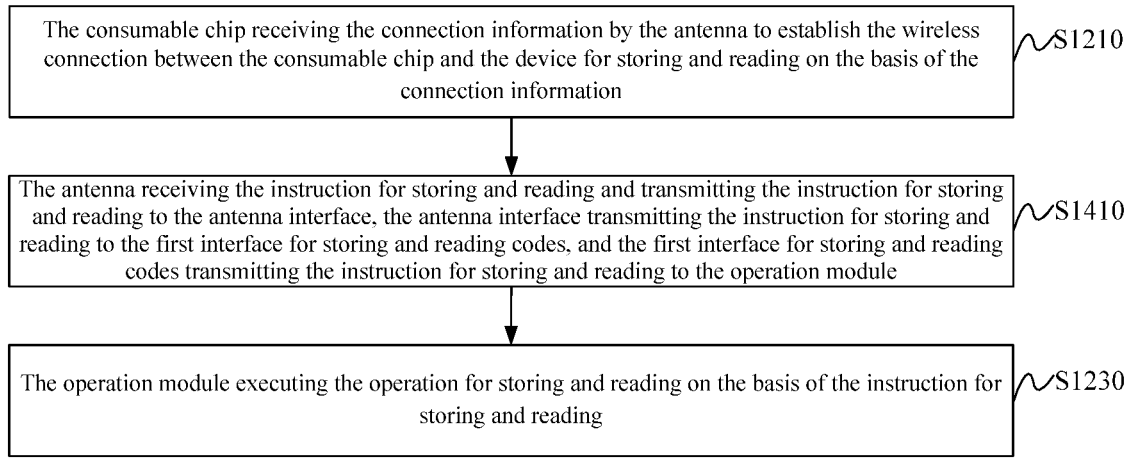
FIG. 14 is a fifth flowchart of a storing and reading method of a consumable chip in an embodiment of the present disclosure.

In an embodiment, FIG. 14 is a fifth flowchart of a storing and reading method of a consumable chip in an embodiment of the present disclosure. Referring to FIG. 14, the antenna receiving the instruction for storing and reading and transmitting the instruction for storing and reading to the interface module, and the interface module transmitting the instruction for storing and reading to the operation module may include step 1410.

Step 1410 may include that the antenna receiving the instruction for storing and reading and transmitting the instruction for storing and reading to the antenna interface, the antenna interface transmitting the instruction for storing and reading to the first interface for storing and reading codes, and the first interface for storing and reading codes transmitting the instruction for storing and reading to the operation module.

The present embodiment applies to a case that the interface module of the consumable chip includes the antenna interface and the first interface for storing and reading codes which are connected with each other, and the first interface for storing and reading codes is further connected to the operation module. The antenna may receive the instruction for storing and reading from the device for storing and reading and transmit the instruction for storing and reading to the antenna interface. The antenna interface 341 may convert a received instruction for storing and reading from an electrical signal to a digital signal which could be recognized by the module for storing and reading codes in the operation module, and transmit a converted instruction for storing and reading to the first interface for storing and reading codes. The first interface for storing and reading codes may transmit the converted instruction for storing and reading to the operation module to realize the operation for storing and reading to the consumable chip. The process of receiving, converting and transmitting signals is not only applicable to the transmission of the instruction for storing and reading, but also applicable to the process of connection establishment and various stages of data exchange between the consumable chip and the device for storing and reading. Since the first substrate of the consumable chip is provided with the antenna, the consumable chip itself may complete the wireless connection and wireless storing and reading without accessing an additional wireless connection module. Meanwhile, the first interface for storing and reading codes may perform information transmission with the operation module, and the consumable chip may execute the operation for storing and reading either or both of by a wireless way and by the first interface for storing and reading codes, providing more selectivity for storing and reading to the consumable chip.

Figure 15:
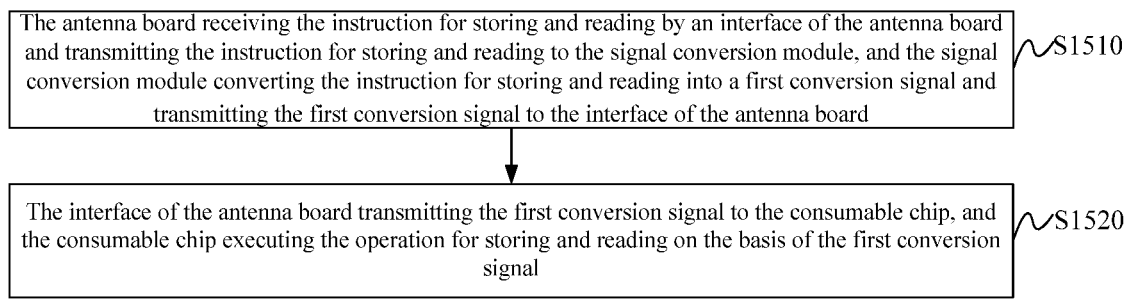
FIG. 15 is a first flowchart of another storing and reading method of a consumable chip in an embodiment of the present disclosure.

According to another aspect of the present disclosure, FIG. 15 is a first flowchart of another storing and reading method of a consumable chip in an embodiment of the present disclosure. Referring to FIG. 15, the storing and reading method of the consumable chip provided in this embodiment may include step 1510 and step 1520.

Step 1510 may include that the antenna board receiving the instruction for storing and reading by an interface of the antenna board and transmitting the instruction for storing and reading to the signal conversion module, and the signal conversion module converting the instruction for storing and reading into a first conversion signal and transmitting the first conversion signal to the interface of the antenna board.

Step 1520 may include that the interface of the antenna board transmitting the first conversion signal to the consumable chip, and the consumable chip executing the operation for storing and reading on the basis of the first conversion signal.

In the present embodiment, a scheme for wireless storing and reading to the consumable chip is provided by disposing the antenna board outside the consumable chip, and the antenna board is added to achieve the above scheme. The antenna board may include the interface of the antenna board and the signal conversion module, and the interface of the antenna board may include, but not limited to, a function interface, a second interface for storing and reading codes, the antenna interface, etc. For example, the interface of the antenna board may include the antenna interface connected to the antenna, and the antenna board may receive information by the antenna interface. Alternatively, the antenna may be external to the antenna board instead of being disposed on the antenna board. The antenna board may include the signal conversion module, and the signal conversion module and the interface of the antenna board may convert and transmit signals bi-directionally or uni-directionally. For example, a received electrical signal of the instruction for storing and reading may be converted to a digital signal, and the digital signal may also be converted to an electrical signal by the signal conversion module. Alternatively, the antenna board may further include an interface connected to the consumable chip. For example, the first interface for storing and reading codes of the consumable chip may be connected to the second interface for storing and reading codes of the antenna board by connecting the first contact point for storing and reading codes of the consumable chip to the second contact point for storing and reading codes of the antenna board. When the antenna board receives the instruction for storing and reading, the instruction for storing and reading may be converted into a digital signal by the signal conversion module, and the digital signal may be transmitted to the consumable chip by the interface of the antenna board. Meanwhile, a received digital signal from the consumable chip may be transmitted into an electrical signal by the signal conversion module, and the electrical signal may be transmitted by a signal transmitting interface in the interface of the antenna board. The present embodiment provides a scheme to achieve wireless storing and reading without changing the consumable chip on an original consumable.

Figure 16:
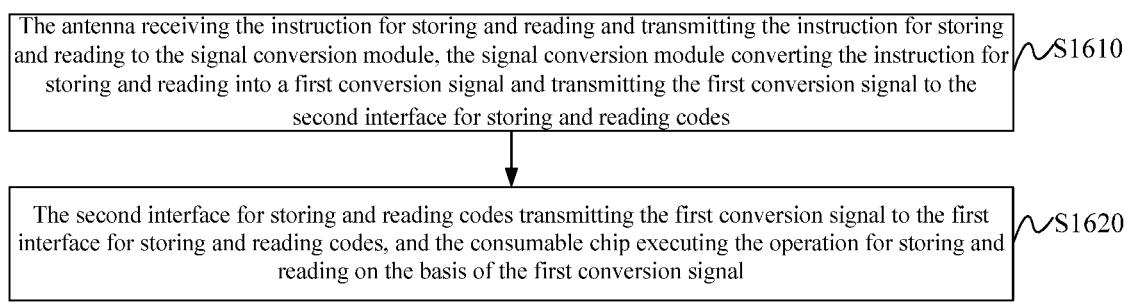
FIG. 16 is a second flowchart of another storing and reading method of a consumable chip in an embodiment of the present disclosure.

In an embodiment, the antenna board may include the second die, a second substrate, and the antenna. The second die may be encapsulated on the antenna board, and the antenna may be disposed on the second die. The second die is provided with the second interface for storing and reading codes, the antenna interface, and the signal conversion module. The antenna is connected to the antenna interface, and the consumable chip is provided with a first interface for storing and reading codes. FIG. 16 is a second flowchart of another storing and reading method of a consumable chip in an embodiment of the present disclosure. Referring to FIG. 16, the method may include step 1610 and step 1620.

Step 1610 may include that the antenna receiving the instruction for storing and reading and transmitting the instruction for storing and reading to the signal conversion module, the signal conversion module converting the instruction for storing and reading into a first conversion signal and transmitting the first conversion signal to the second interface for storing and reading codes.

Step 1620 may include that the second interface for storing and reading codes transmitting the first conversion signal to the first interface for storing and reading codes, and the consumable chip executing the operation for storing and reading on the basis of the first conversion signal.

In the present embodiment, the antenna board is provided with the antenna, and this embodiment provides a scheme to achieve wireless storing and reading without changing the consumable chip on an original consumable and with adding the antenna board.

In an embodiment, before the antenna board receiving the instruction for storing and reading by the interface of the antenna board, the method may further include: the antenna board receiving the connection information by the interface of the antenna board and transmitting the connection information to the signal conversion module, the signal conversion module converting the connection information into a second conversion signal and transmitting the second conversion signal to the interface module, the interface module transmitting the second conversion signal to the consumable chip, and the consumable chip establishing the wireless connection between the consumable chip and the device for storing and reading on the basis of the second conversion signal. Alternatively, in addition to the step of establishing the wireless connection, the step of authentication of the consumable chip as mentioned in the above embodiment may also be added. The process of establishing the wireless connection and the authentication of the consumable chip enable the process for storing and reading of the consumable chip more secure and reliable. In addition, the verification of the operation result for storing and reading may also be added after the operation for storing and reading of the consumable chip, and the connection between the device for storing and reading and the consumable chip may be disconnected after confirming a successful completion of the operation for storing and reading to save energy.

In an embodiment, the consumable chip may include the first contact point for storing and reading codes. In a case that the first contact point for storing and reading codes is connected to the first interface for storing and reading codes and the first contact point for storing and reading codes receives the instruction for storing and reading, the consumable chip may execute the operation for storing and reading on the basis of the instruction for storing and reading. The consumable chip may be stored and read either or both of by connecting the device for storing and reading to the first contact point for storing and reading codes, and by receiving the signal from the antenna board by the first contact point for storing and reading codes, providing more selectivity for the upgrade of the consumable chip.

It should be understood that although the individual steps in the flowchart of FIG. 10 to FIG. 16 are shown sequentially as indicated by the arrows, the steps are not necessarily performed sequentially in the order indicated by the arrows. Except as expressly stated herein, there is no strict sequential limitation on the execution of these steps, and these steps may be executed in other orders. Moreover, at least some of the steps in FIG. 10 to FIG. 16 may include multiple sub-steps or multiple stages that are not necessarily performed at the same time, but may be performed at different times, and the order in which these sub-steps or stages are performed is not necessarily sequential, but may alternate with other steps or at least some of the sub-steps or stages of other steps.

In the above storing and reading method of the consumable chip, the connection information may be received by the interface module and the wireless connection between the consumable chip and the device for storing and reading may be established on the basis of the connection information. The consumable chip may receive the instruction for storing and reading by the interface module and execute the operation for storing and reading on the basis of the instruction for storing and reading, realizing storing and reading to the consumable chip by wireless means. Even if the consumable chip has been encapsulated, the consumable has been packed, and the consumable chip has no electrical contact with the printer, it is still possible to execute the operation for storing and reading to the consumable chip in an efficient and low-cost way.

A person of ordinary skill in the art can understand that all or part of the processes in the methods of the above examples can be performed by means of a computer program to instruct the relevant hardware to do so. The computer program may be stored in a non-volatile computer readable storage medium. When the computer program is executed, processes such as those of the examples of each of the methods described above can be included. Any reference to a memory, a storage, a database, or other media used in the examples provided in the present disclosure may include non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration and not limitation, the RAM can be available in a variety of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link DRAM (SLDRAM), a memory bus (Rambus) direct RAM (RDRAM), a direct memory bus dynamic RAM (DRDRAM), and a memory bus dynamic RAM (RDRAM), etc.

In the description of this specification, reference to the description of the terms "some embodiments", "other embodiments", "present embodiment", etc. means that the specific features, structures, materials, or characteristics described in conjunction with the embodiment or example are included in at least one embodiment or example of the present disclosure. In this specification, the schematic description of the above terms does not necessarily refer to the same embodiment or example.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

What is claimed is:

1. A consumable chip system, comprising a consumable chip and an antenna board,
    wherein the consumable chip comprises a first die and a first substrate, the first die is encapsulated on the first substrate, the first die is provided with an interface module, the first substrate is provided with a signal conversion module, and the antenna board is provided with a wireless transceiver module;
    the wireless transceiver module is configured to receive connection information and an instruction for storing and reading;
    the signal conversion module is connected to the interface module and the wireless transceiver module, respectively, the signal conversion module is configured to convert the instruction for storing and reading into a first conversion signal and transmit the first conversion signal to the interface module, and the consumable chip is configured to execute an operation for storing and reading on the basis of the first conversion signal received by the interface module; and
    the consumable chip system is configured to receive connection information by the wireless transceiver module, and establish a wireless connection between the consumable chip and a device for storing and reading on the basis of the connection information, wherein the connection information is transmitted from the device for storing and reading.

2. The consumable chip system of claim 1, wherein the wireless connection comprises at least one of an antenna communication, a Bluetooth communication, or an infrared communication.

3. The consumable chip system of claim 1, wherein the consumable chip comprises a first contact point for storing and reading codes disposed on the first substrate, the interface module comprises a first interface for storing and reading codes, and the first interface for storing and reading codes is connected to the first contact point for storing and reading codes; and the first contact point for storing and reading codes is configured to receive the instruction for storing and reading and transmit the instruction for storing and reading to the first interface for storing and reading codes.

4. The consumable chip system of claim 3, wherein the signal conversion module is connected to the first contact point for storing and reading codes and the wireless transceiver module, respectively, and the first contact point for storing and reading codes is further configured to receive the first conversion signal transmitted from the signal conversion module and transmit the first conversion signal to the first interface for storing and reading codes.

5. The consumable chip system of claim 3, wherein the first substrate is provided with a first antenna contact point, the signal conversion module is connected to the first antenna contact point and the interface module, respectively; and the antenna board is provided with a second antenna contact point, the wireless transceiver module is connected to the second antenna contact point, and the second antenna contact point is connected to the first antenna contact point.

6. The consumable chip system of claim 3, wherein the consumable chip further comprises an operation module, the operation module comprises a module for storing and reading codes, and the module for storing and reading codes is connected to the interface module; and the module for storing and reading codes is configured to execute an operation for storing and reading to the consumable chip based on the first conversion signal or the instruction for storing and reading received by the interface module.

7. The consumable chip system of claim 1, wherein the signal conversion module comprises a modulation-demodulation submodule, a digital logic submodule, and a storage module, the digital logic submodule is connected to the modulation-demodulation submodule and the storage module, respectively, the modulation-demodulation submodule is connected to the wireless transceiver module, and the digital logic submodule is connected to the interface module;

the modulation-demodulation submodule is configured to modulate the instruction for storing and reading transmitted by the device for storing and reading into a standard digital logic signal and transmit the standard digital logic signal to the digital logic submodule;

the digital logic submodule is configured to convert the standard digital logic signal into the first conversion signal and transmit the first conversion signal to the consumable chip and to the storage module; and the storage module is configured to store the first conversion signal transmitted by the digital logic submodule.

8. The consumable chip system of claim 7, wherein the instruction for storing and reading further comprises a reset signal, the signal conversion module further comprises a reset logic submodule, the reset logic submodule is configured to read reset information in the storage module according to the reset signal and transmit the reset information to the consumable chip, and the reset information is pre-stored in the storage module.

9. The consumable chip system of claim 7, wherein the instruction for storing and reading further comprises a data feedback signal;

the digital logic submodule is further configured to read data in the consumable chip according to the data feedback signal and transmit the data in the consumable chip to the modulation-demodulation submodule; and the modulation-demodulation submodule is further configured to transmit the data in the consumable chip to the device for storing and reading by the wireless transceiver module.

10. The consumable chip system of claim 7, wherein the instruction for storing and reading further comprises an update signal of storage data, and the signal conversion module further comprises a storage control module configured to update data in the storage module according to the update signal of storage data.

11. A consumable container, comprising a consumable and the consumable chip system of claim 1, wherein the consumable chip system is mounted on the consumable.

12. The consumable container of claim 11, wherein the wireless connection comprises at least one of an antenna communication, a Bluetooth communication, or an infrared communication.

13. The consumable container of claim 11, wherein the consumable chip comprises a first contact point for storing and reading codes disposed on the first substrate, the interface module comprises a first interface for storing and reading codes, and the first interface for storing and reading codes is connected to the first contact point for storing and reading codes; and the first contact point for storing and reading codes is configured to receive the instruction for storing and reading and transmit the instruction for storing and reading to the first interface for storing and reading codes.

14. The consumable container of claim 13, wherein the signal conversion module is connected to the first contact point for storing and reading codes and the wireless transceiver module, respectively, and the first contact point for storing and reading codes is further configured to receive the first conversion signal transmitted from the signal conversion module and transmit the first conversion signal to the first interface for storing and reading codes.

15. The consumable container of claim 13, wherein the first substrate is provided with a first antenna contact point, the signal conversion module is connected to the first antenna contact point and the interface module, respectively; and the antenna board is provided with a second antenna contact point, the wireless transceiver module is connected to the second antenna contact point, and the second antenna contact point is connected to the first antenna contact point.

16. The consumable container of claim 13, wherein the consumable chip further comprises an operation module, the operation module comprises a module for storing and reading codes, and the module for storing and reading codes is connected to the interface module; and the module for storing and reading codes is configured to execute an operation for storing and reading to the consumable chip based on the first conversion signal or the instruction for storing and reading received by the interface module.

17. The consumable container of claim 11, wherein the signal conversion module comprises a modulation-demodulation submodule, a digital logic submodule, and a storage module, the digital logic submodule is connected to the modulation-demodulation submodule and the storage module, respectively, the modulation-demodulation submodule is connected to the wireless transceiver module, and the digital logic submodule is connected to the interface module;

the modulation-demodulation submodule is configured to modulate the instruction for storing and reading transmitted by the device for storing and reading into a standard digital logic signal and transmit the standard digital logic signal to the digital logic submodule;

the digital logic submodule is configured to convert the standard digital logic signal into the first conversion signal and transmit the first conversion signal to the consumable chip and to the storage module; and the storage module is configured to store the first conversion signal transmitted by the digital logic submodule.

18. The consumable container of claim 17, wherein the instruction for storing and reading further comprises a reset signal, the signal conversion module further comprises a reset logic submodule, the reset logic submodule is configured to read reset information in the storage module according to the reset signal and transmit the reset information to the consumable chip, and the reset information is pre-stored in the storage module.

19. The consumable container of claim 17, wherein the instruction for storing and reading further comprises a data feedback signal;

the digital logic submodule is further configured to read data in the consumable chip according to the data feedback signal and transmit the data in the consumable chip to the modulation-demodulation submodule; and the modulation-demodulation submodule is further configured to transmit the data in the consumable chip to the device for storing and reading by the wireless transceiver module.

20. The consumable container of claim 17, wherein the instruction for storing and reading further comprises an update signal of storage data, and the signal conversion module further comprises a storage control module configured to update data in the storage module according to the update signal of storage data.

* * * * *

UNITED STATES PATENT AND TRADEMARK OFFICE
CERTIFICATE OF CORRECTION

| | |
|---|---|
| PATENT NO. | : 11,893,444 B2 |
| APPLICATION NO. | : 18/215180 |
| DATED | : February 6, 2024 |
| INVENTOR(S) | : Tianxiang Liu and Heng Zhang |

It is certified that error appears in the above-identified patent and that said Letters Patent is hereby corrected as shown below:

On the Title Page

Correct Foreign Application Priority Data in Item (30), as follows:
Jan. 20, 2020 (CN) ................................. 202010065535.2
Sep. 18, 2020 (CN) ................................. 202010989422.1

Signed and Sealed this
Ninth Day of April, 2024

*Katherine Kelly Vidal*

Katherine Kelly Vidal
*Director of the United States Patent and Trademark Office*